United States Patent [19]

Igashira et al.

[11] Patent Number: 4,649,886
[45] Date of Patent: Mar. 17, 1987

[54] FUEL INJECTION SYSTEM FOR AN INTERNAL COMBUSTION ENGINE

[75] Inventors: Toshihiko Igashira, Toyokawa; Taro Tanaka, Nagoya; Yasuyuki Sakakibara, Nishio, all of Japan

[73] Assignee: Nippon Soken, Inc., Nishio, Japan

[21] Appl. No.: 549,372

[22] Filed: Nov. 7, 1983

[30] Foreign Application Priority Data

| Nov. 10, 1982 [JP] | Japan | 57-198150 |
| Jul. 11, 1983 [JP] | Japan | 58-124823 |
| Aug. 20, 1983 [JP] | Japan | 58-152059 |

[51] Int. Cl.$^4$ ............................................. F02M 39/00
[52] U.S. Cl. ................................. 123/498; 123/357; 123/447; 239/585
[58] Field of Search ............... 123/498, 357, 358, 359, 123/447, 506, 467, 299–300; 239/585

[56] References Cited

U.S. PATENT DOCUMENTS

| 2,997,994 | 8/1961 | Falberg | 123/447 |
| 3,418,980 | 12/1968 | Benson | 123/498 |
| 3,500,799 | 3/1970 | Benson | 123/498 |
| 3,738,576 | 6/1973 | O'Neill | 239/585 |
| 3,753,426 | 8/1973 | Lilley | 123/498 |
| 3,983,855 | 10/1976 | Jarrett | 123/447 |
| 4,073,276 | 2/1978 | Nicolls | 123/498 |
| 4,333,434 | 6/1982 | Brunais | 123/299 |

Primary Examiner—Carl Stuart Miller
Attorney, Agent, or Firm—Cushman, Darby & Cushman

[57] ABSTRACT

A fuel injection system for an internal combustion engine includes sensors for sensing the reference rotational position of the engine, a unit injector for compressing the fuel and injecting a predetermined amount of the fuel, and an electronic control device. The unit injector includes an actuator such as a piezoelectric actuator, a piston, and an injection valve. The piezoelectric actuator comprises a columnar laminated body of disk-shaped piezoelectric elements. The laminated body is expanded or compressed in the axial direction of the column according to the application of a positive or a negative high voltage. The electronic control device controls the frequency of the voltage supplied to the actuator during the period from the timing of a reference rotational position and controls, accordingly, the amount of fuel injection in accordance with the frequency of the voltage supplied to the actuator.

14 Claims, 24 Drawing Figures

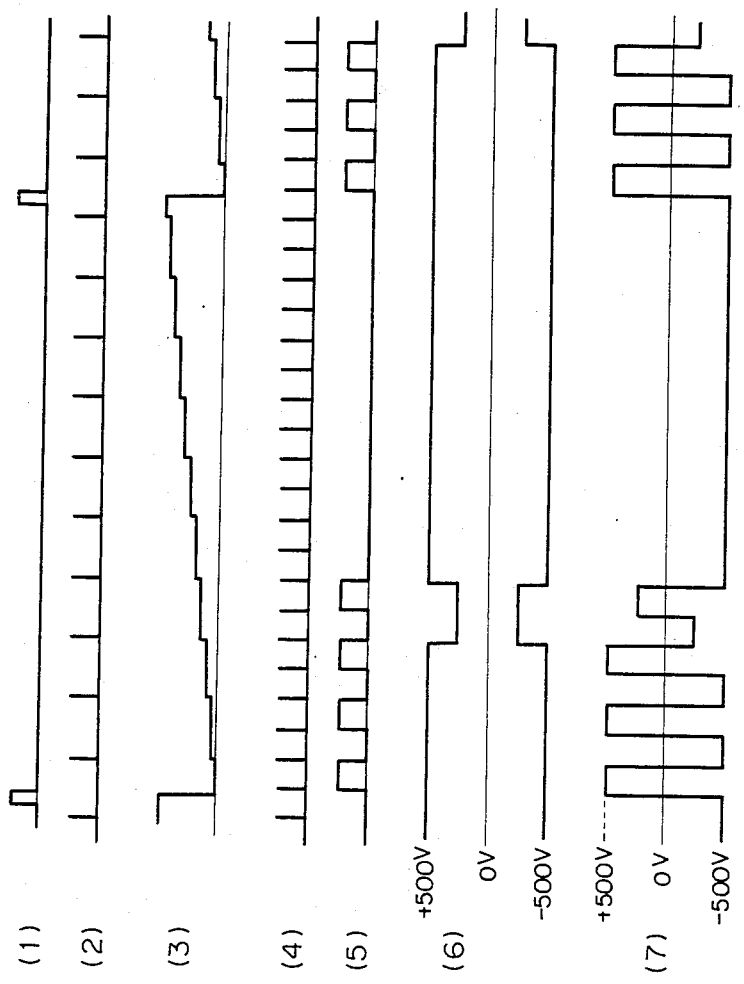

1ST SUBROUTINE

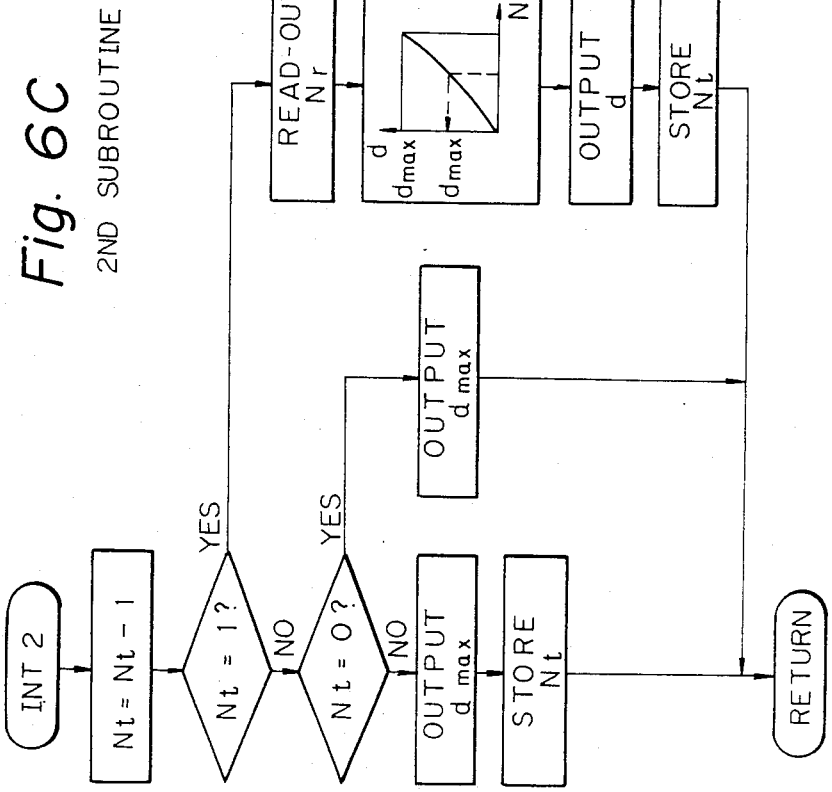

4TH SUBROUTINE

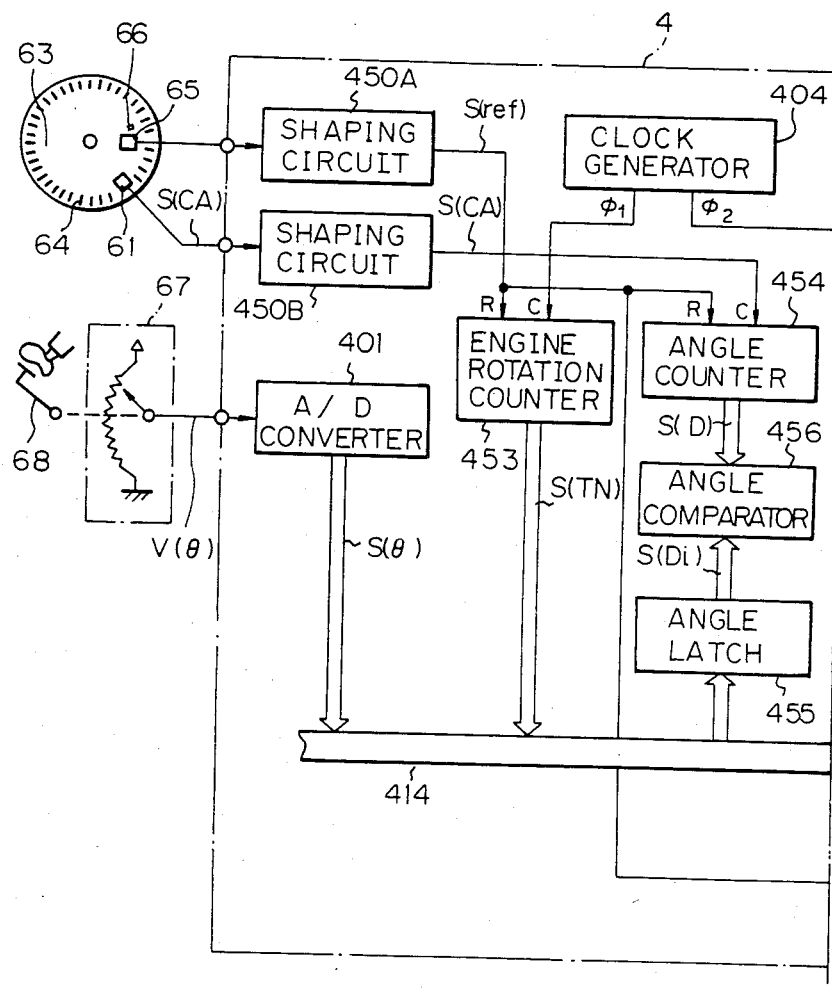

5TH SUBROUTINE

6TH SUBROUTINE

7TH SUBROUTINE

FUEL INJECTION SYSTEM FOR AN INTERNAL COMBUSTION ENGINE

BACKGROUND OF THE INVENTION

1. Field of the Invention

The present invention relates to a fuel injection system for injecting fuel into an internal combustion engine and more particularly to a fuel injection system for electronically controlling the amount of fuel injection or the injection quantity.

2. Description of the Prior Art

A conventional system of this type supplies low-pressure fuel to an electromagnetic fuel injector by means of a low-pressure fuel supply device. The only function of the injector is to open/close a nozzle, and, hence, it serves to inject the low-pressure fuel. Since the injection quantity is controlled in accordance with the valve opening time, one injection operation is performed per rotation of the engine.

Since the conventional fuel injection system has the structure described above, there is a problem in that it cannot inject high-pressure fuel.

For this reason, in the case of high-pressure injection, a combination of an injection pump of the plunger type, a long injection pipe, and an automatic valve has usually been used, and, accordingly, essential electrical control has not been realized because of the difficulties of such essential electrical control.

SUMMARY OF THE INVENTION

It is an object of the invention to provide an improved fuel injection system of a high-pressure type capable of quick response and high precision control by carrying out electrical control in which the selection of the fuel injection amount is carried out on the basis of the number of injections during the period from a specific timing in synchronization with the engine rotation, with the use of a unit injector in which a piston-type pump using an electrical actuator capable of expansion/contraction and an injection valve located near the actuator are combined.

According to the present invention, there is provided a fuel injection system for an internal combustion engine including: sensors for sensing the reference rotational position of the engine; a unit injector for compressing the fuel and injecting a predetermined amount of the fuel, the unit injector including an actuator adapted to be expanded or compressed in response to driving voltages, a piston for taking in fuel to a pump chamber and compressing the taken-in fuel, and an injection valve for injecting the compressed fuel; and an electronic control device for controlling the number of applications of the driving voltage during the period from the timing of the reference rotational position and controlling the fuel injection amount on the basis of the number of drivings of the actuator.

BRIEF DESCRIPTION OF THE DRAWINGS

In the drawings.

FIG. 5 shows the waveforms of signals at the respective parts of the ECU shown in FIG. 4;

FIGS. 6A, 6B, 6C, 6D, and 6E are flow charts of the operation of the system when the ECU shown in FIG. 4 is used;

FIGS. 10, 10A and 10B show block diagrams of another example of an ECU in the system shown in FIG. 1;

DESCRIPTION OF THE PREFERRED EMBODIMENTS

Figure 1:
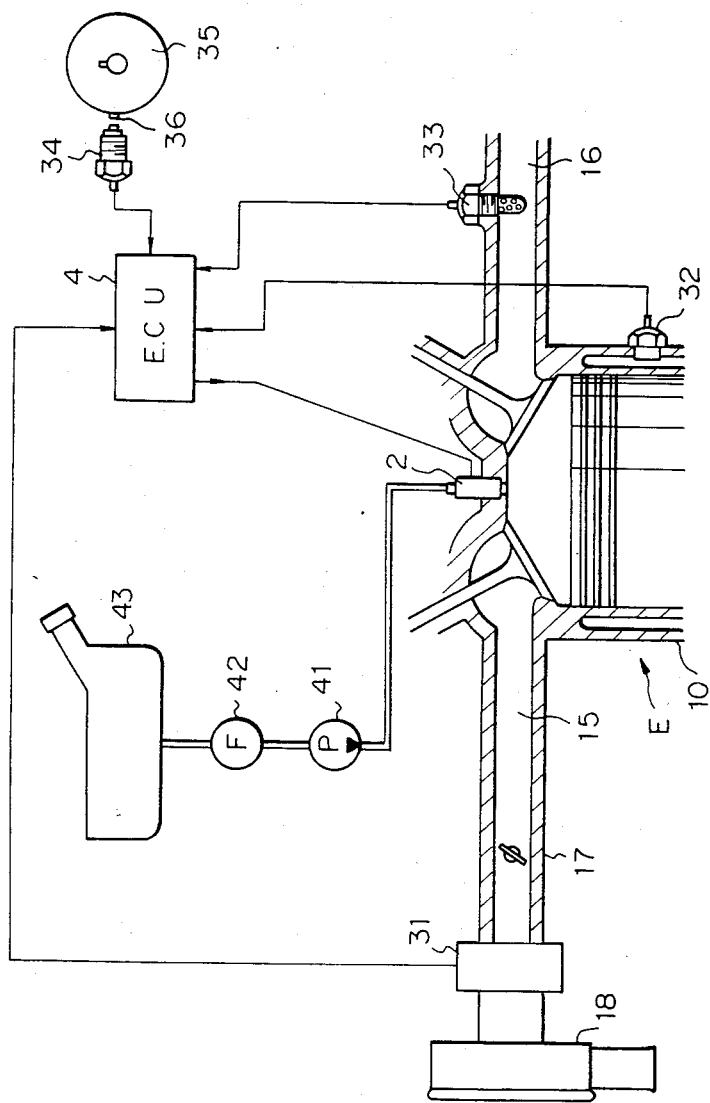
FIG. 1 is a schematic view showing a fuel injection system for an internal combustion engine according to an embodiment of the present invention.

FIG. 1 shows a fuel injection system for an internal combustion engine according to the present invention. Referring to FIG. 1, reference symbol E denotes a four-cycle internal combustion engine which comprises a cylinder block 10, a piston, an intake valve, an exhaust valve, an intake pipe 15, an exhaust pipe 16, and so on. A throttle valve 17 is arranged in the intake pipe 15. A unit injector 2 is arranged at a cylinder head in order to inject fuel directly into the cylinder.

An air cleaner 18 is mounted on the intake pipe 15, and an air flow meter 31 for measuring the intake air flow rate is arranged downstream of the air cleaner 18. The air flow meter 31 may comprise a hot-wire flow meter which generates an analog voltage proportional to the intake air flow rate.

Fuel from a fuel tank 43 is supplied to the unit injector 2 through a feed pump 41 and a filter 42. The feed pump 41 is of the type that stops operating when the delivery pressure thereof exceeds a preset value. The feed pump 41 may be a diaphragm type or an electromagnetic type. The delivery pressure of the pump 41 is set to be 0.5 kg/cm$^2$. It is also effective to insert a fuel reservoir or an accumulator between the feed pump 41 and the unit injector 2. A water temperature sensor 32 for detecting the cooling water temperature is mounted on the water jacket of the cylinder block 10. The water temperature sensor 32 may comprise, for example, a thermistor.

An oxygen (O$_2$) sensor 33 for generating an electrical signal representing the oxygen concentration in the exhaust gas is arranged in the exhaust pipe 16. The O$_2$ sensor 33 generates a binary signal in accordance with whether the air-fuel ratio A/F is on the lean mixture side or the rich mixture side with reference to the theoretical air-fuel ratio.

The magnetic pickup 34 for sending a reference timing signal to an ECU 4 is mounted on an engine E. The magnetic pickup 34 detects the projection 36 formed on the magnetic disc 35 mounted on the camshaft (rotating once upon each rotation of the engine). The timing at which the magnetic pickup 34 and the projection 36 oppose each other, that is, at which the reference timing signal is supplied to the ECU 4, is set to be a predetermined timing after the exhaust valve is closed and before the piston reaches the upper dead point. The ECU 4 calculates the fundamental (injection) number (frequency) in proportion to the output signal form the air flow meter 31. The unit injector 2 is driven for the number of times obtained by correction of the fundamental number in accordance with the signals from the water temperature sensor and the $O_2$ sensor from the timing indicated by the reference timing signal.

Figure 4:
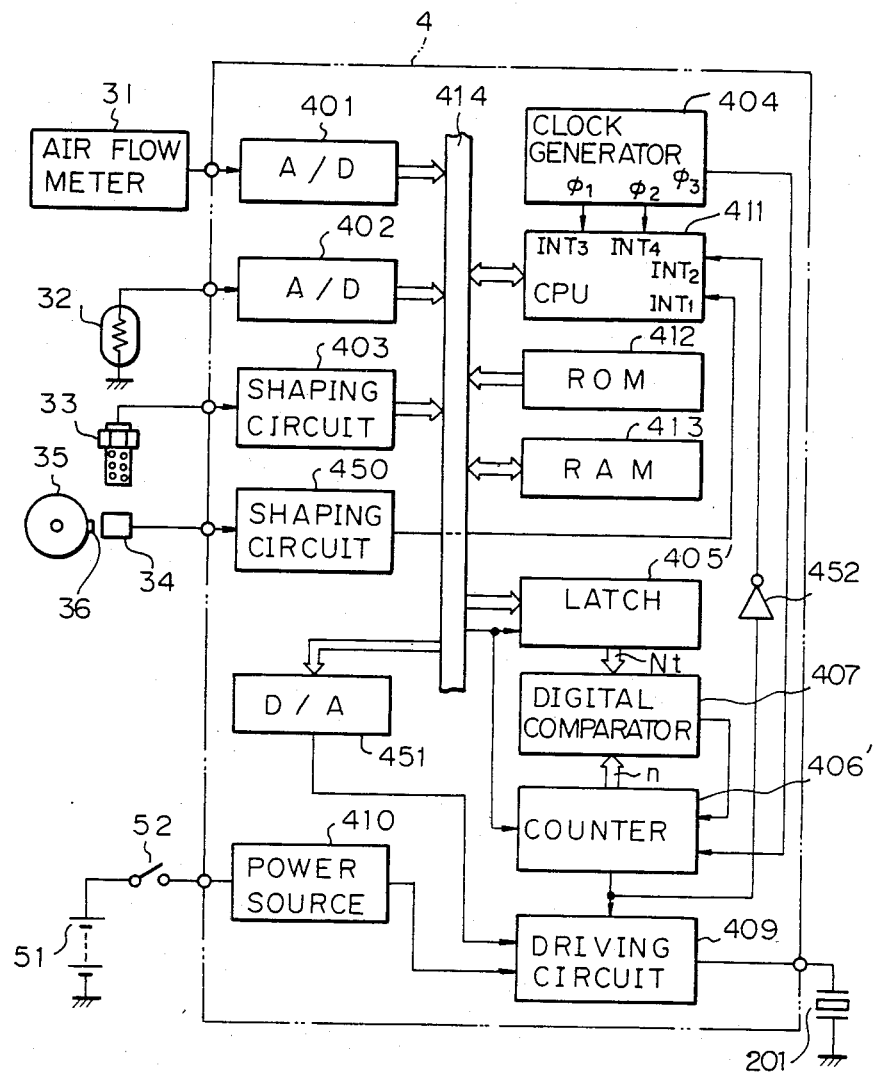
FIG. 4 is a block diagram showing an example of an electronic control unit (ECU) in the system shown in FIG. 1.

Reference numeral 51 denotes a battery and reference numeral 52 denotes an ignition switch (FIG. 4).

Figure 2:
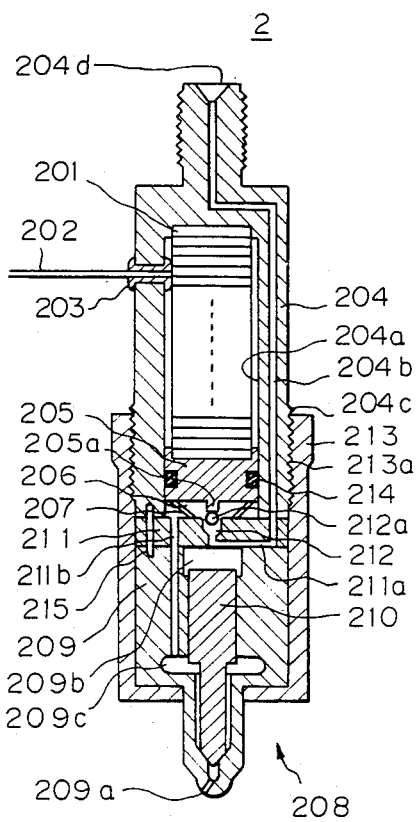
FIG. 2 is a sectional view of a unit injector in the system shown in FIG. 1.

FIG. 2 is a sectional view of the unit injector 2 shown in FIG. 1. The unit injector 2 operates by the expansion/contraction of a piezoelectric actuator 201 and injects fuel accordingly.

The piezoelectric actuator 201 comprises a columnar laminated body of thin disk-shaped elements each having a piezoelectric effect. When a voltage of +500 V is applied to each element, the element expands about 0.5 $\mu$m along the axial direction of the column. Conversely, when a voltage of −500 V is applied to each element, the element contracts by about 0.5 $\mu$m. Accordingly, when 100 of such elements are laminated together, a combined expansion/contraction equal to 100 times that of each element can be obtained. Each element comprises a ceramic called PZT, which is obtained by sintering lead zirconium titanate. A voltage is applied to the piezoelectric actuator 201 through a lead wire 202. The lead wire 202 is led to the outside of the unit injector 2 through an upper casing 204 via a grommet 203 and is connected to the ECU 4.

Expansion/contraction of the piezoelectric actuator 201 is directly transmitted to a piston 205, thereby causing it to reciprocate. The piston 205 slides within a cylinder 204a defined within the upper casing 204 so as to expand/contract the volume of a pump chamber 206, thereby providing a pumping operation. A disc spring 207 is arranged in the pump chamber 206 and biases the piston 205 in the contracting direction of the actuator 201. When the pump chamber 206 contracts, fuel inside the pump chamber 206 is compressed to a high pressure and is supplied to an injection valve 208. The high-pressure fuel supplied to the injection valve 208 is injected from a nozzle 209a.

The injection valve 208 consists of a nozzle body 209 and a needle valve 210. The needle valve 210 has a stepped shape comprising a small-diameter portion and a large-diameter portion. The distal end of the needle valve 210 open/closes the seat of the nozzle body 209. Fuel pressure in a back pressure chamber 209b supplied by the feed pump 41 acts on the end face of the large-diameter portion of the needle valve 210 in such a manner that the needle valve 210 closes the nozzle 209a. Fuel supplied to the back pressure chamber 209b of the nozzle body 209 is supplied through a fuel inlet 204d of the upper casing 204, a fuel path or channel 204b formed in the wall defining the upper casing 204, and a fuel path 211a defined in a distance piece 211.

The distance piece 211 separates the pump chamber 206 from the injection valve 208. The distance piece 211 has a fuel path 211b communicating the pump chamber 206 with a fuel chamber 209c. The fuel chamber 209c is defined within the nozzle body 209, and the fuel pressure at the stepped portion of the needle valve 210 serves to open the nozzle 209a. Thus, in the normal state, the needle valve 210 closes the nozzle 209a. However, when the volume of the pump chamber 206 is decreased, the needle valve 210 is raised to open the nozzle 209a.

When the volume of the pump chamber 206 increases, fuel is drawn into the pump chamber 206 from the fuel path 211a through a ball-type check valve 212. The check valve 212 is arranged in the distance piece 211. A projection 205a of the piston 205 serves as a stopper for preventing a steel ball 212a serving as a valve plug from fully entering the pump chamber 206.

The upper casing 204, the distance piece 211, and the nozzle body 209 are of the same diameter, are stacked in the order named, and are pressed and securely fixed along the axial direction in a cap nut-like lower casing 213. A female thread 213a of the lower casing 213 and a male thread 204c of the upper casing 204 mesh with each other. Reference numeral 214 denotes an O-ring, and reference numeral 215 denotes a knock pin.

The amount of fuel delivered per operation of the unit injector 2 is determined by the stroke of the piezoelectric actuator 201, which is, in turn, determined by the driving voltage applied. An injection quantity or amout q per injection operation and a driving voltage Vd hold a substantially linear relationship.

Figure 3:
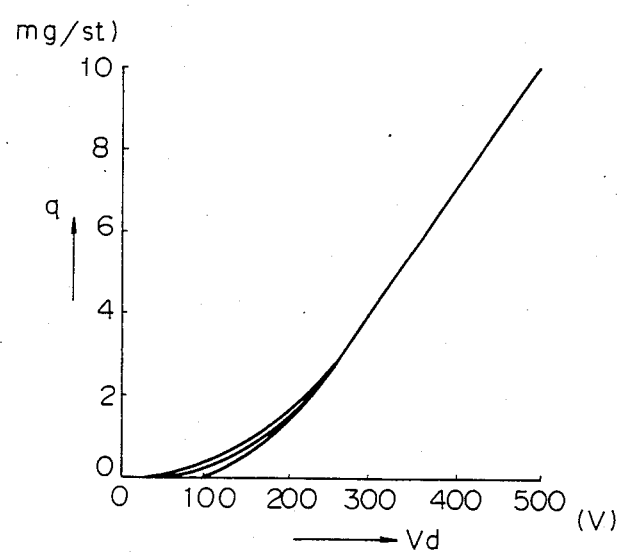
FIG. 3 is a graph showing the operation characteristics of the unit injector shown in FIG. 2.

FIG. 3 shows the relationship between the injection quantity q and the driving voltage Vd. Referring to FIG. 3, the driving voltage Vd (V) is plotted along the axis of the abscissa and the injection quantity q (mg/st) is plotted along the axis of the ordinate. The driving voltage and the injection quantity are linear within a region wherein the driving voltage is about 300 V or higher. When the driving voltage is less than 300 V, the injection quantity is unstable. On the other hand, when the driving voltage exceeds 500 V, a flashover may occur in the direction of thickness of the piezoelectric element. In view of this, the driving voltage is preferably within the range of 300 to 500 V.

The mode of operation of the system shown in FIG. 1 will now be described.

In response to an output signal from the air flow meter 31, the ECU 4 calculates a fundamental injection frequency proportional to the intake air flow rate (g/sec). The calculated fundamental injection frequency is corrected in accordance with output signals from the water temperature sensor 32 and the $O_2$ sensor 33 to produce a corrected injection frequency. The ECU 4 drives the unit injector 2 by as much as the corrected frequency with a reference position as the original point.

Correction of the fundamental frequency is performed in the following manner.

When a signal from the water temperature sensor 32 indicates that the temperature of the coolant water is equal to or lower than 60°, correction is not carried out by the $O_2$ sensor 33, but correction is carried out by the water temperature sensor 32. The latter correction is carried out as follows. Data of a suitable amount increase ratio corresponding to the water temperature is preselected by, for example, a bench test, and the preselected data is stored in the ECU 4. The ECU 4 determines a necessary amount increase ratio corresponding to the water temperature detected by the water temperature sensor 32. The number of injections corrected by the water temperature sensor 32 is calculated by multiplying the fundamental number of injections by the determined amount increase ratio. The unit injector 2 is driven by the corrected number of injections. For example, when the amount increase ratio corresponding to the water temperature 20° C. is preselected as 1.5 and the air amount is 0.3 g/2 rev., the number of injections is calculated as $5.52 \times 1.5 = 8.28$, where 5.52 is the fundamental number of injections and 1.5 is the amount increase ratio. Thus, the unit injector is driven by the number 8.28 of injections. When the water temperature exceeds 60° C., the warming-up period of the engine E is considered to have ended, and correction in accordance with the detected water temperature is no longer performed. Instead, correction is performed in accordance with an output signal from the $O_2$ sensor 33.

Correction of the fundamental frequency in accordance with an output signal from the $O_2$ sensor 33 is performed by incrementing/decrementing a correction coefficient p for multiplication by the fundamental frequency in accordance with a lean or rich state. When the output signal from the $O_2$ sensor 33 indicates a rich mixture, the correction coefficient is decremented in decrements of, for example, 0.04/sec. Conversely, when the output signal from the $O_2$ sensor 33 indicates a lean mixture, the correction coefficient is incremented in increments of, for example, 0.06/sec. When the fundamental frequency is multiplied by such a correction coefficient, the driving frequency is gradually decreased in response to a rich signal so that the air-fuel ratio A/F changes toward that of a lean mixture. On the other hand, the driving frequency is gradually increased in response to a lean signal so that the air-fuel ratio changes toward that of a rich mixture. In this manner, correction can be performed so that the air-fuel ratio always converges on the stoichiometrical air-fuel ratio.

The above-described driving frequency is not an integer. However, it is possible to deal with the fraction of the driving frequency by changing the stroke of the piezoelectric actuator 201. The relationship between the applied voltage and the stroke is not completely linear. Therefore, it is necessary to investigate such a relationship and store the investigated relationship in the ECU 4. For example, when the driving frequency is 5.52, application of the voltage should be carried out in such a manner that a voltage five times a pulse voltage of from $-500$ V to $+50$ V is applied and then a pulse voltage of from $-260$ V to $+260$ V is applied.

The structure and operation of the ECU 4 will now be described. FIG. 4 is a block diagram showing the configuration of the ECU 4. The ECU 4 consists fundamentally of a microcomputer system. A first A/D converter 401 A/D converts an output signal from the air flow meter 31 into a 16-bit digital signal which is supplied onto a bus line 414. A second A/D converter 402 A/D converts an output signal from the water temperature sensor 32 into a 16-bit digital signal which is supplied onto the bus line 414. A first shaping circuit 403 compares an output signal from the oxygen ($O_2$) sensor 33 with a predetermined reference level for shaping it. When the oxygen concentration in the exhaust gas is high, the first shaping circuit 403 supplies a lean signal of level "0" to a bus line 414. When the oxygen concentration in the exhaust gas is low, the first shaping circuit 403 supplies a rich signal of level "1" to the bus line 414.

The magnetic pickup 34 produces a signal when the projection 36 of the magnetic disc 35 assumes the position closest to the magnetic pickup 34. The produced signal is supplied to the second shaping circuit 450, which produces a reference timing signal which is supplied to the input terminal INT 1 of a central processing unit (CPU) 411.

A clock generator 404 generates clock signals $\phi 1$, $\phi 2$, and $\phi 3$ of stable frequencies. The clock signals $\phi 1$, $\phi 2$, and $\phi 3$ have frequencies of, for example, 1 kHz, 100 kHz, and 2 kHz, respectively. The clock signal $\phi 1$ is connected to an interrupt input INT3 of the CPU 411, and the clock signal $\phi 2$ is connected to an interrupt input INT4 of the CPU 411.

A 16-bit latch 405 latches the signal $N_t$ by the timing of the strobe signal, and the latched signal $N_t$ is produced as the output signal. The number $N_t$ is an integer converted from the number of drivings of the unit injector calculated by the CPU 411. A digital comparator as a coincidence detection circuit 407 compares the output signal of the latch 405 with the parallel output signal of a counting circuit (described later) and produces a coincidence signal of level "1" when the compared signals become equal. A 16-bit binary counter 406 receives at its clock input C the clock signal $\phi 3$ of 2 kHz from the clock generator 404.

A counter 406 also has a start input terminal and a stop input terminal. The start input terminal of the counter 406 receives a strobe signal, which is also supplied to the latch 405, and the stop input terminal receives a coincidence output from the digital comparator 407. Thus, when a predetermined injection number $N_t$ is preset in the latch 405, the counter 406 is started. Upon counting the predetermined injection number $N_t$, the counter 406 receives a coincidence signal from the comparator 407 to stop counting, and the internal counter is reset. During this time, pulses of duty 50% (1 kHz) are generated for the predetermined injection number $N_t$ at the serial output of the counter 406. These pulse signals are supplied to a driving circuit 409. A D/A converter 451 converts the value corresponding to the driving voltage calculated by the CPU 411 into an analog voltage which is supplied to the driving circuit 409. The driving circuit 409 comprises a variable voltage source for changing the output voltage in accordance with the voltage from the A/D converter 408 and a switching portion for switching the variable voltage source by the driving signal from the serial output from the counter 406. The variable voltage source produces voltages of $+500$ V when the output voltage from the A/D converter 408 is 5 V and $+0$ V when the output from the A/D converter 408 is 0 V. The response time of the variable voltage source is sufficiently fast in relation to the driving frequency (1 kHz).

The switching portion, which comprises switching elements such as transistors, produces a positive voltage of the variable voltage source when the serial output signal of the counter 406 is "1" and produces a negative voltage of the variable voltage source when the serial output signal of the counter 406 is "0".

The output signal of the switching portion is supplied to the piezoelectric actuator 201 to drive the piezoelectric actuator, with a predetermined timing and voltage, to perform the pumping action. A power source 410 comprises a stabilizer which stabilizes power supplied from the battery 51 through a key switch 52 and a DC/DC converter which applies high voltages of $+500$ V to the driving circuit 409 for driving the piezoelectric actuator 201.

The 16-bit CPU 411 receives the output signal of the second shaping circuit 450 at its input INT1, the serial output signal of the counter 406 at its input INT2, the clock signal $\phi 1$ at its input INT3, and the clock signal $\phi 2$ at its input INT4, as was previously described. The priority order of the interrupts is INT1, INT2, INT3, and INT4. A read-only memory (ROM) 412 stores a program and data. A random-access memory (RAM) 413 is provided for CPU operation. The CPU 411 calculates the fundamental frequency for driving the unit injector 2 on the basis of the intake air flow rate from the air flow meter 31, corrects the fundamental frequency in accordance with the outputs from the water temperature sensor and the $O_2$ sensor, and supplies the corrected frequency to the latch 405 and the signal corresponding to the fraction of the fundamental frequency to the D/A converter 408.

The mode of operation of the ECU 4 having the configuration described above will now be described. FIG. 5 is a timing chart showing states at respective parts of the circuit. FIG. 5 shows the waveforms of the following signals:

(1) fundamental timing signal (INT1)
(2) clock signal $\phi 1$ (INT3)
(3) $\Sigma$(Air)
(4) clock signal $\phi 3$
(5) t contents serial output signal (AV(INT2))
(6) driving voltage
(7) driving of the piezoelectric actuator.

Figure 6A:
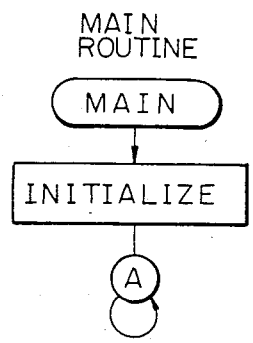
Figure 6D:
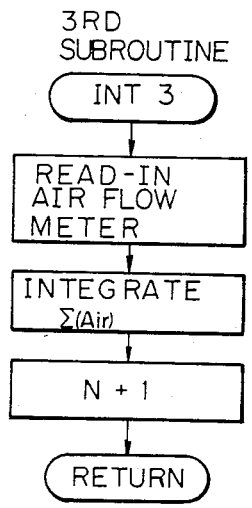
Figure 6B:
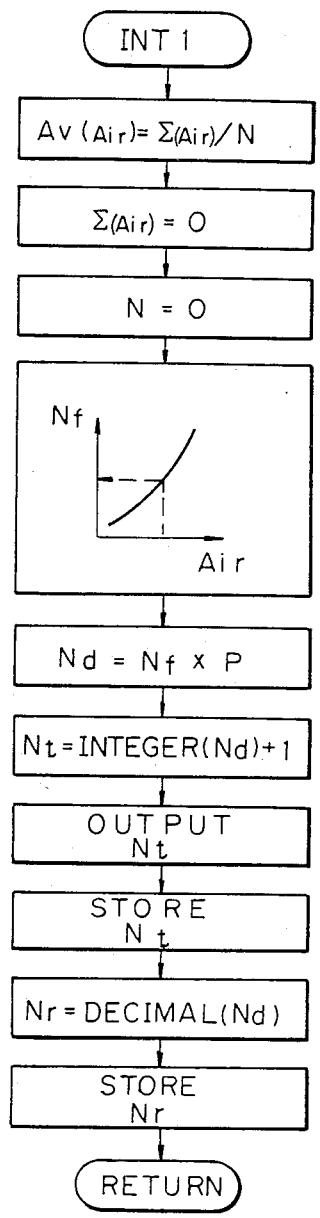

FIGS. 6A to 6E are flow charts of the program. FIG. 7 is a timing chart corresponding to the flow charts shown in FIGS. 6A to 6E. FIG. 7 shows the waveforms of the following signals:

(1) clock signal $\phi 2$ (INT4)
(2) $O_2$ sensor rich/lean signal
(3) correction coefficient P.

When the key switch 52 is turned ON, power is supplied to the ECU 4 from the battery 51. Then predetermined power is supplied from the power source 410 to the controller and the driving circuit 409. When the power source is ON, each interrupt routine is prohibited, and the MAIN routine shown in FIG. 6A alone can be initialized. In the MAIN routine, initialization, such as interrupt enable, the setting of various preset values, and so on, is performed. Thereafter, the flow enters the idle loop.

The operation state of the system will now be considered. The third routine INT3 shown in FIG. 6D is started in response to the clock signal $\phi 1$ of 1 kHz frequency. The data of the intake air flow rate is read in from the first A/D converter. This data indicates the intake air flow rate when the third routine is started. As is well known, the intake air flow pulsates in accordance with each stroke of the engine. For this reason, the average value of the intake air flow rate must be calculated. The data of the intake air flow rate read in the third routine is integrated and the integrated value is stored in the RAM. The integrated value is indicated as $\Sigma$(Air). At the same time, a number of integration N is also incremented by 1 every time the third routine is started. The data N is used for obtaining the average value of the intake air flow rate. The data $\Sigma$(Air) and the data N are initialized in the first routine (described later). Thereafter, the third routine returns to the MAIN routine and is ended.

Figure 6E:
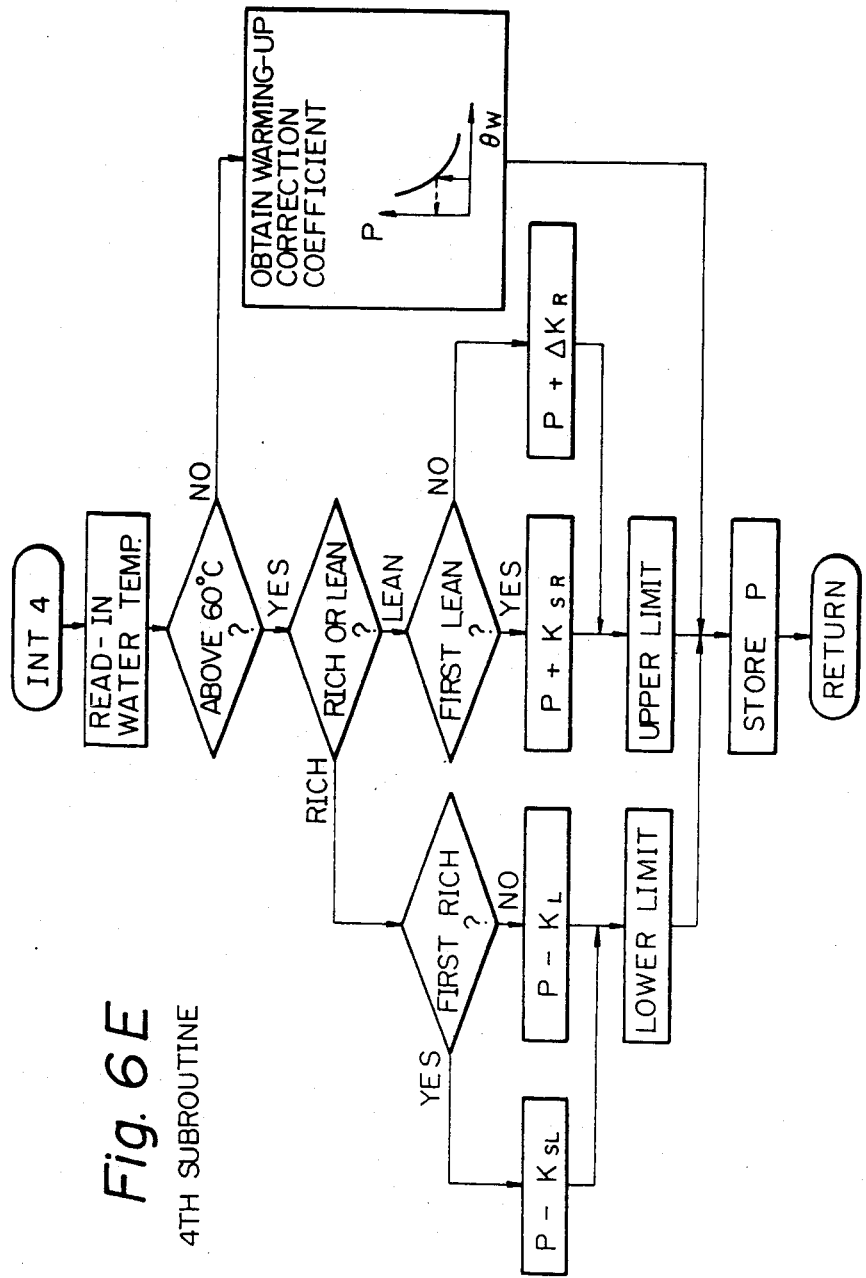
Figure 7:
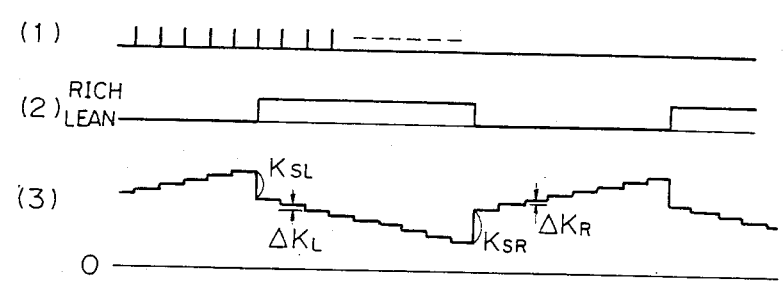
FIGS. 7, 8, and 9 show the waveforms of signals in the flow charts shown in FIGS. 6A to 6E.
Figure 8:
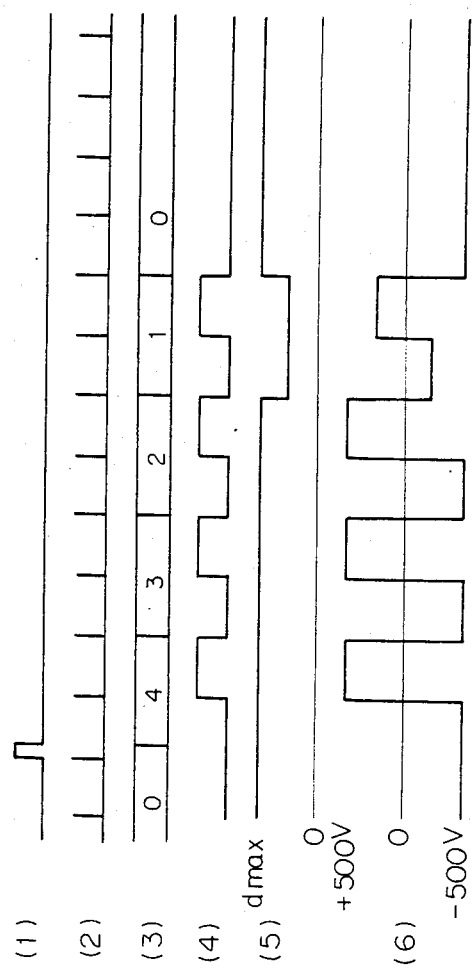

The fourth routine INT4 shown in FIG. 6E is started by the clock signal $\phi 2$ having a frequency of 100 kHz. First, the water temperature is read in from the second A/D converter. Next, it is discriminated if the read-in water temperature is 60° C. or higher. If NO, correction of the fundamental frequency is performed in accordance with a water temperature for a warming-up period. For this purpose, the amount increase ratio corresponding to each water temperature, which is determined by a bench test, is stored in the ROM. The amount increase ratio is then calculated by interpolation on the basis of the read-in water temperature data. The calculated value is stored as a correction coefficient P in the RAM and the flow returns to the MAIN routine. When the read-in water temperature is 60° C. or higher, this correction is not performed since the warming-up period has been completed. Instead, an air-fuel ratio feedback is performed in accordance with an output signal from the $O_2$ sensor 33. According to this method, the correction coefficient for multiplication of the fundamental frequency is incremented/decremented in accordance with the rich/lean signal from the $O_2$ sensor 33.

The output signal from the $O_2$ sensor 33 indicating a rich or lean state of the exhaust gas is read in through the first shaping circuit 403. When the signal indicates a first rich state, a preset skip amount $K_{SL}$ is subtracted from the correction coefficient P to obtain $P-K_{SL}$. In any subsequent rich state, the correction coefficient P is decremented by a selected ratio $\Delta K_L$. For example, if the ratio is selected to be 0.04/sec, $K_L$ for the interrupt frequency 100 Hz of INT4 is calculated to be $\Delta K_L = 0.0004/10$ msec. Accordingly, every time a rich state is detected in the fourth routine INT4, the correction coefficient is decremented by $\Delta K_L$ to obtain $P - \Delta K_L$. Conversely, when the signal from the $O_2$ sensor 33 indicates a lean state, it is checked if the lean state is the first lean state. If YES, a skip amount $K_{SR}$ is added to the correction coefficient P to obtain $P + K_{SR}$. If NO, the correction coefficient P is incremented by a selected ratio $\Delta K_r$. For example, if the ratio is selected to be 0.06/sec, $\Delta K_r$ is 0.0006/10 msec. Accordingly, every time a lean state is detected, in the routine INT4, the correction coefficient P is incremented by $\Delta K_R$. This process is illustrated in FIG. 7.

Although not shown in the flow chart, when the temperature of the $O_2$ sensor 33 is low and has not yet been activated or a fuel cut is performed by engine braking or the like, the rich or lean state may continue for a considerably long period of time. In such a case, the upper and lower limits of the correction coefficient P may be present. The correction coefficient is limited to falling within the range defined by these upper and lower limits. Furthermore, when the rich or lean state continues for a time period exceeding a predetermined time period, the correction coefficient can be forcibly returned to 1.0 or another suitable value. At the end of INT4, the obtained correction coefficient P is stored in the RAM and the routine returns.

The first routine INT1 will now be described with reference to FIG. 6B. The first routine INT1 is started every time the output signal, that is, the reference timing signal, from the second shaping circuit 450 is received (upon every two rotations of the engine). In the first routine INT1, the average intake air flow rate is calculated. The calculated average value is corrected and is produced. The data $\Sigma$(Air) integrated in the third routine INT3 and the number of integration N are read from the RAM so as to calculate $Av(Air) = \Sigma(Air)/N$. The term $Av(Air)$ corresponds to the average intake air flow rate in the period between the preceding reference timing signal and the current reference timing signal (INT1). Thereafter, as a preparation for the next integration operation, the data Σ(Air) and the data N are cleared to 0. The fundamental injection frequency $N_f$ is calculated from the intake air flow rate Av(Air). For this purpose, the fundamental frequency $N_f$ corresponding to the intake air flow rate Av(Air) is determined by a bench test. The obtained result is stored in the ROM in the form of a map. Then the fundamental frequency $N_f$ is calculated by interpolation from the preceding intake air flow rate Av(Air). Subsequently, the fundamental frequency $N_f$ is corrected in accordance with the correction coefficient P calculated in the fourth routine INT4. The correction coefficient P stored in the RAM is read and is multiplied by the fundamental frequency $N_f$ so as to obtain a corrected driving frequency $N_d$.

When the intake air flow rate is 0.3 g/2 rev and the correction coefficient is 1.1, $5.52 \times 1.1 = 6.072$ is obtained as $N_d$. The obtained $N_d$ is not an integer. The driving of the unit injector 2 must be an integer and the fractions must be processed in the same way. According to this embodiment, the fractions are dealt with in the following manner. If the driving frequency $N_d$ is calculated to be 6.072, for example, the integer part is used for driving the actuator by a full stroke (i.e., with voltages of +500 V). For the fractions, the driving voltage of the piezoelectric actuator 201 is changed to change the stroke from 0 to a full stroke. The relationship between the driving voltage and the stroke is experimentally determined and is store in the ROM in advance. When the obtained driving frequency is 0.072, the actuator is driven by voltages of ±36 V. In order to perform such processing, the CPU 411 produces a frequency $N_t$ which is (the integer part of the driving frequency $N_d$) +1. For the frequency ($N_t - 1$), the actuator need only be driven by a fuel stroke, that is, by voltages of ±500 V. Accordingly, the output from the D/A converter 451 is set as 5 V. For the last frequency $N_t$ data, a value corresponding to the fractions is stored in the D/A converter 451 so as to obtain a predetermined stroke. The frequency $N_t$ is latched in the latch 405. The signal to the D/A converter 451 is set as 5 V. A value corresponding to the driving voltage for a predetermined stroke is supplied to the D/A converter 451 only for the last frequency $N_t$. The frequency $N_t$ is latched in the latch 405 and is supplied to the D/A converter 451. At the end of the routine, the integer part data or the frequency $N_t$ and fraction part data $N_r$ are stored in the RAM and the flow returns to the MAIN routine. The second routine INT2 is started every time the driving signal as the serial output from the counter 406 falls. In the second routine, the data $N_t$ stored in the RAM in the fifth routine is read and is decremented by 1. It is then checked if the data $N_t$ is 1, processing of the fractions is performed. The dealing of the fractions is performed in the following manner. The fraction part data $N_r$ of the number $N_d$ stored in the RAM calculated in the first routine is read. In order to obtain a value d corresponding to $N_r$, d corresponding to $N_r$ is calculated by interpolation in accordance with the map stored in the ROM. The calculated value d is supplied to the D/A converter. The updated number $N_t$ is stored in the RAM and the flow returns to the MAIN flow. If the value obtained by subtracting 1 from the number $N_t$ is not 1, it is then checked if this value is 0. If it is determined to be 0, the actuator has been driven for the predetermined number of times, and the data dmax is supplied to the D/A converter so as to set the driving voltages of ±500 V. The flow then returns to the MAIN routine for the next cycle. If ($N_t - 1$) is neither 0 nor 1, the actuator need be driven by a full stroke. Then the data dmax is supplied to the D/A converter so as to set the driving voltages of ±500 V, and the updated number $N_t$ is stored in the RAM. The flow then returns to the MAIN routine. An example of the above dealing is as follows. If the data $N_d$ after correction is 3.5, $N_t=4$ and $N_r=0.4$. Accordingly, the data $N_t$ and the driving voltage waveform change as is shown in FIG. 7. The actuator is driven by a full stroke for the first three times and by a half stroke for the last time. Although the structure and operation of a preferred example of the ECU 4 is described above, various modifications and alterations are possible for achieving the same or similar functions. For example, although the operations of the engine warming-up correction by the water temperature sensor and the A/F feedback correction by the $O_2$ sensor are described above, it is also possible to add various corrections, such as the correction for the engine start period, the correction for the acceleration period, the correction for the deceleration period, and the like.

Also, although, in the embodiment described above, the driving frequency is corrected by multiplying the fundamental injection frequency by the correction coefficient, it is also possible to correct only the driving voltage, keeping the driving frequency constant, by availing the characteristic of a piezoelectric actuator that the expansion of a piezoelectric actuator corresponds to the applied voltage. This alternative correction method can be realized by changing the voltage supplied to the driving circuit in accordance with the correction coefficient, keeping the driving injection frequency of the piezoelectric actuator constant.

In addition, although, in the embodiment described above, the outlet of the unit injector 2 is located at the combustion chamber of the engine E, it is also possible to locate the outlet of the unit injector 2 at the air intake pipe 15.

Furthermore, although, in the embodiment described above, an engine of a single cylinder type is used, it is also possible to use an engine of a plural cylinder type. When an engine of a plural cylinder type is used, it is necessary to provide a unit injector for each of the cylinders in the case of the system of injection into the cylinder and to provide either a unit injector for each of the cylinders or a unit injector for each of the groups of the cylinders in the case of the system of injection into the air intake manifold.

Still further, although, in the embodiment described above, the air flow meter 31 as a means for direct measurement of air flow is used, it is also possible to use a method for indirect measurement of air flow by calculating the air flow from the air intake manifold pressure, the intake air temperature, the engine rotation rate, or the like.

Additionally, although, in the embodiment described above, the air flow meter 31 and the $O_2$ sensor 33 are used, it is also possible to dispense with the air flow meter or the $O_2$ sensor if the combustion of the engine allows a wide range of the air-fuel ratio. In this alternatively possible case, the unit injector can be driven in dependence of the change of the opening degree of the throttle valve, the accelerator lever, or the accelerator pedal.

In the above embodiments, fuel is injected at substantially the same intervals from the reference timing.

Figure 9:
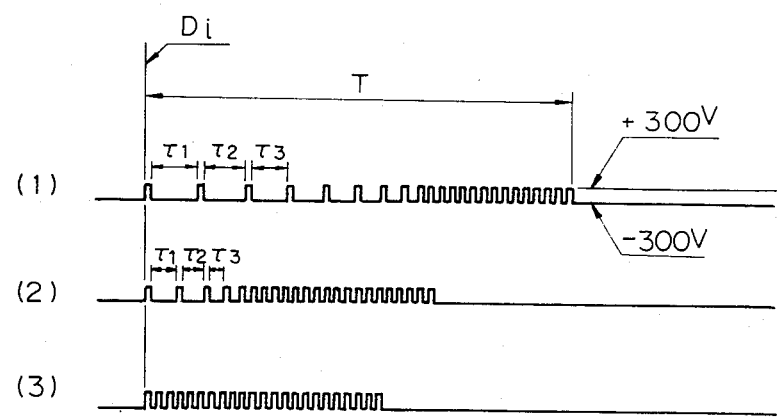

However, in a diesel engine, it is preferable to change the intervals as is shown in FIG. 9.

FIG. 9 shows the waveforms of the driving signals to be supplied to the piezoelectric actuator. Referring to FIG. 9, time is plotted along the axis of the abscissa, and the driving signal voltage is plotted along the axis of the ordinate. $D_i$ indicates the injection start timing, T indicates the entire injection interval, and $\tau 1$, $\tau 2$, and $\tau 3$ indicate injection intervals. In FIG. 9, (1) to (3), respectively, show the signal waveforms in low-speed drive, medium-speed drive, and high-speed drive of the engine.

Assume that the driving signal voltages are $\pm 300$ V and the injection quantity injected per injection operation of the unit injector is 1 mm$^3$. If the internal combustion engine requires fuel in the amount of 30 mm$^3$ per combustion operation, the unit injector 2 injects 30 times from the injection start timing $D_i$.

The injection intervals of 30 times are not equal. The injection interval $\tau_n$ ($\mu$sec) between the nth injection and the (n+1)th injection for rotation rate N (rpm) is given by:

$$\tau_n = 300 - 10(n-1)(N-1000)/10 \; (\mu sec)$$

When $\tau_n$ is 60 $\mu$sec or less, it is kept at 60 $\mu$sec.

Accordingly, the injection interval $\tau$ is shortened with an increase in the number of injection times and the rotation rate. However, over a certain limit, the interval is kept constant.

If the required injection quantity is decreased, the injection is completed upon the completion of a predetermined number of injection operations. The duration for which a voltage of 300 V is applied to the piezoelectric actuator for single injection is set as 60 $\mu$sec.

Particular numerals discussed hereinabove are only examples and must be properly selected in accordance with the actual type of internal combustion engine involved. If the maximum injection number per combustion operation is 50, the load resolution of the internal combustion engine is only 1/50. In order to obtain a finer resolution, the driving voltage to be applied at the last driving timing for each combustion operation may be rendered variable.

If the internal combustion engine is a four-cycle internal combustion engine, all of the four cylinders need not inject for the same number of times, and a resolution of 1/(50×4) may be obtained. If two combustion operations of each cylinder are considered as one cycle and the driving number is changed once for each cycle, a resolution of 1/(50×2) can be obtained. A resolution of 1/(50×4×2) may be obtained if this control is performed for all of the four cylinders.

In this manner, vigorous combustion may be attained by increasing the injection quantity by shortening the injection interval toward the end of each combustion operation. With the system of this embodiment, the noise is reduced and the combustion efficiency is improved.

In order to perform the control operation as described above, an ECU 4 as is shown in FIG. 10 is used. A sensor for detecting the engine operation state comprises a crank angle sensor and a load sensor.

Figure 10B:
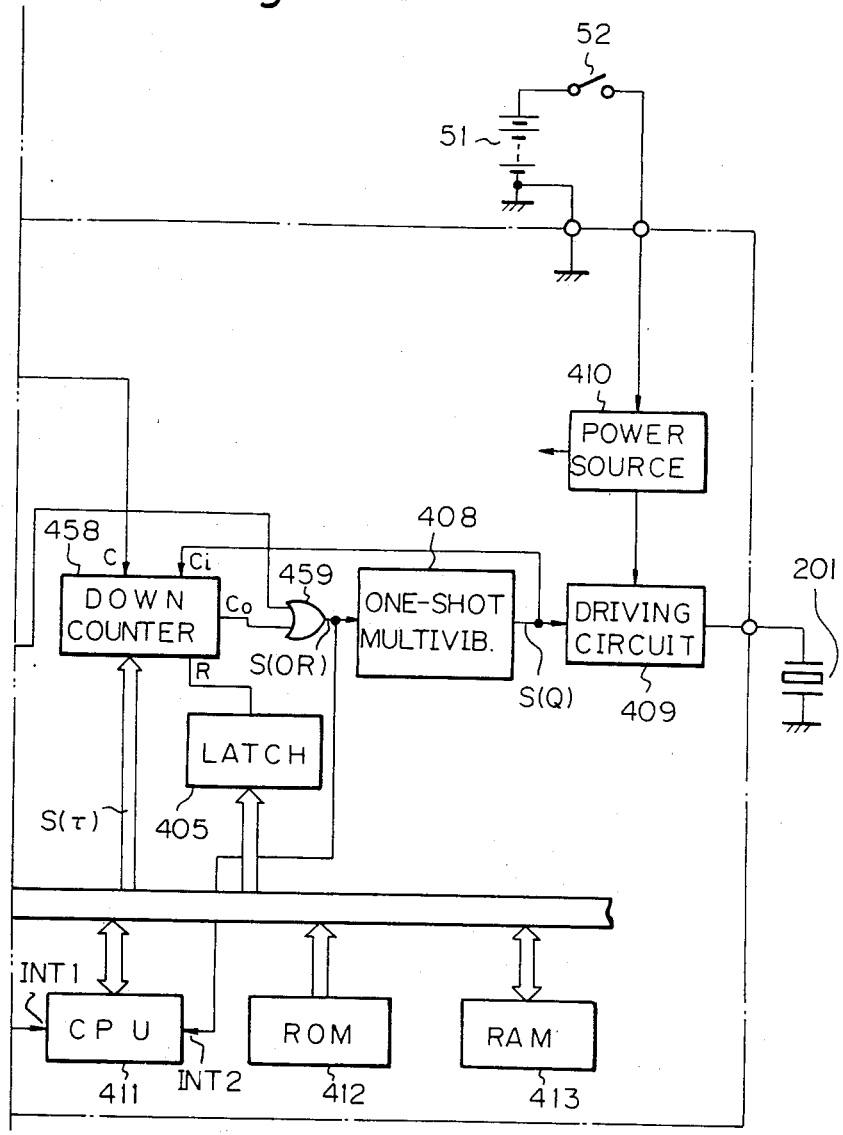

Referring to FIG. 10, a crank angle sensor comprises parts 61 to 66. The angle sensor 61 comprises, for example, a photo interrupter. The sensor 61 is arranged in the vicinity of the outer periphery of a signal plate 63 mounted on a shaft rotating upon each half rotation of the engine crankshaft. The sensor 61 detects a slit 64 formed in the outer periphery of the signal plate 63 and generates 720 angle signals S(CA) upon each rotation of the signal plate 63. Thus, one pulse of the angle sensor corresponds to a rotational angle 1° CA of the engine crankshaft.

A reference position sensor 65 similarly comprises a photo interrupter. The sensor 65 detects a slit 66 formed in the signal plate 63. The slit 66 is formed at such a position that a reference signal is generated at a timing of about 30° CA before the upper dead point of the internal combustion engine.

A load sensor 67 comprises a potentiometer interlocked with an acceleration pedal 68 which is, in turn, interlocked with a throttle valve. The load sensor 67 generates a voltage signal $V(\theta)$ corresponding to an opening $\theta$ of the acceleration pedal 68.

Outputs from the angle sensor 61 and the reference position sensor 65 are shaped by shaping circuits 450A and 450B, respectively, to be converted into digital signals of 0 V or 5 V. The voltage signal $V(\theta)$ from the load sensor 67 is converted into a 16-bit digital signal $S(\theta)$ by an A/D converter 401.

An engine rotation counter 453 is a 16-bit counter and receives a reference signal S(ref) from the shaping circuit 450B at its reset input R and a clock signal $\phi 1$ from a clock generator 404 at its clock input C. The engine rotation counter 453 has a function of automatically stopping at its maximum count so as to prevent overflowing before the reset signal from the shaping circuit 450A is received. Each counter described below also has this function.

The contents of the engine rotation counter 453 are latched when the reset signal is received and are supplied onto the bus line 414. The reference signal S(ref) is used as this reset signal. Accordingly, an output signal S(TN) from the engine rotation counter 453 corresponds to an engine rotation period $T_N$.

An angle counter 454 is a 16-bit counter and receives the reference signal S(ref) at its reset input R and the angle signal S(CA) at its clock input C. The contents S(D) of the angle counter 454 represent an engine rotation angle D after the generation of the reference signal S(ref).

An angle latch 455 is a 16-bit latch. The latch 455 latches an injection start timing $D_i$ from the CPU 411 and supplies it to an angle comparator 456. The angle comparator 456 is a 16-bit comparator and compares an output signal S(D) from the angle counter 454 and an output signal $S(D_1)$ from the angle latch 455. When the signal S(D) is equal to the signal $S(D_i)$, that is, when the engine rotaion angle D reaches the injection start timing $D_i$, the comparator 456 produces a coincidence signal $S_{19}$ of level "1" to an OR circuit 459.

A presentable down counter 458 receives a signal $S(\tau)$ corresponding to the calculated injection interval from the CPU 411 at its DATA input and receives a clock signal $\phi 2$ of 1 MHz from the clock generator 404 at its clock input C. A carry input $C_i$ of the counter 458 receives an output from a one-shot multivibrator 408. When the carry input is at level "0", the counter 458 counts down. When the contents of the down counter 458 reach zero, the counter 458 produces a signal of level "1" at its carry output $C_o$. The down counter 458 also has a reset input R. When the reset input R is at level "1", the counter 458 stops counting.

The latch 405 is a 1-bit latch and supplies a count end flag from the CPU 411 to the reset input R of the down counter 458. Thus, the start and the stop of the down counter 458 are controlled in this manner.

The OR circuit 459 ORs an output signal from the angle comparator 456 and a carry output $C_o$ from the down counter 458. An OR signal S(OR) from the OR circuit 459 is supplied to the one-shot miltivibrator 408. The output signal S(OR) from the OR circuit 459 is supplied to a trigger input of the one-shot multivibrator 408. In synchronization with the leading edge of the signal S(OR), the one-shot multivibrator 408 generates an output signal S(Q) of a predetermined duration, for example, 60 μsec. The output signal S(Q) is supplied to the carry input $C_i$ of the down counter 458.

The interrupt input INT1 of the CPU 411 receives the reference signal S(ref) and the interrupt input INT2 thereof receives the output signal S(OR) from the OR circuit 459.

The mode of operation of the ECU having the configuration described above will now be described.

Figure 11:
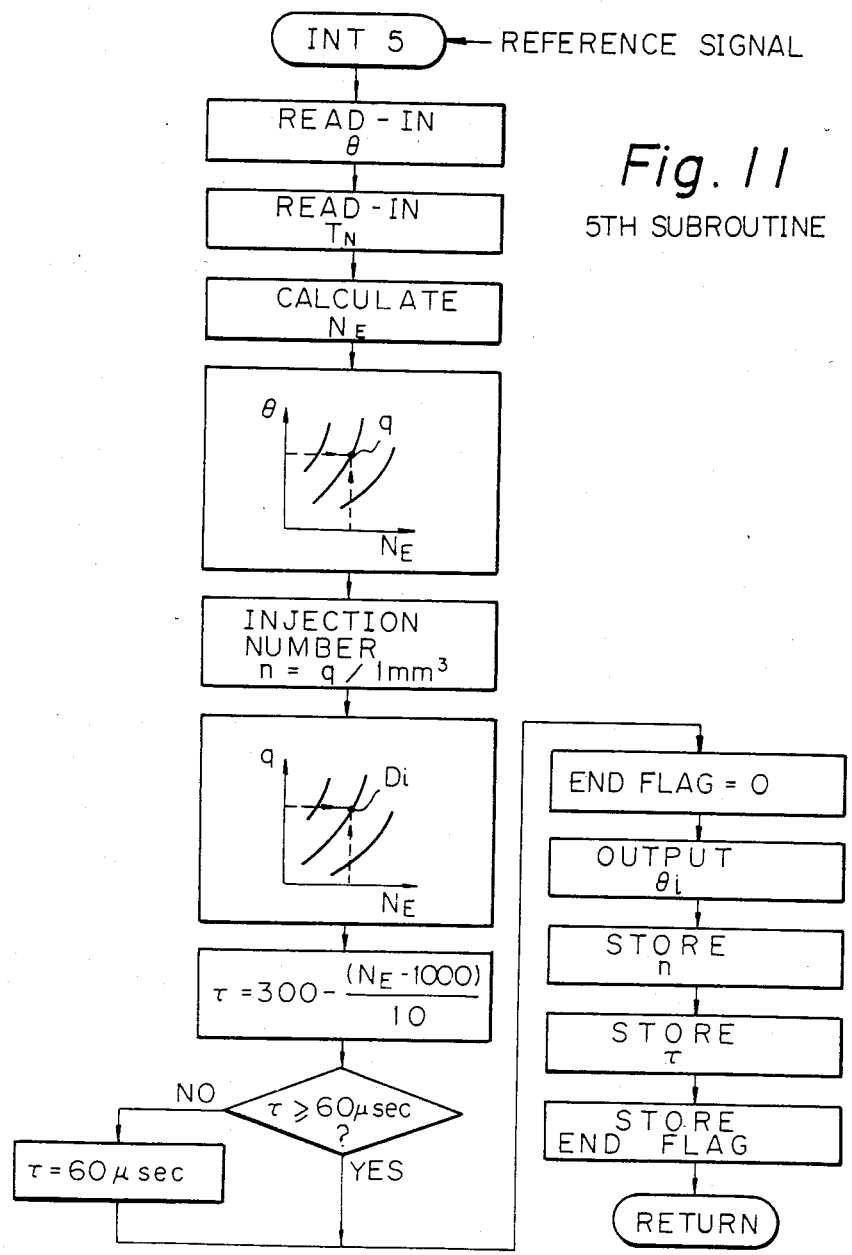
FIGS. 11 and 12 are flow charts of the operation of the system when the ECU shown in FIG. 10 is used.
Figure 12:
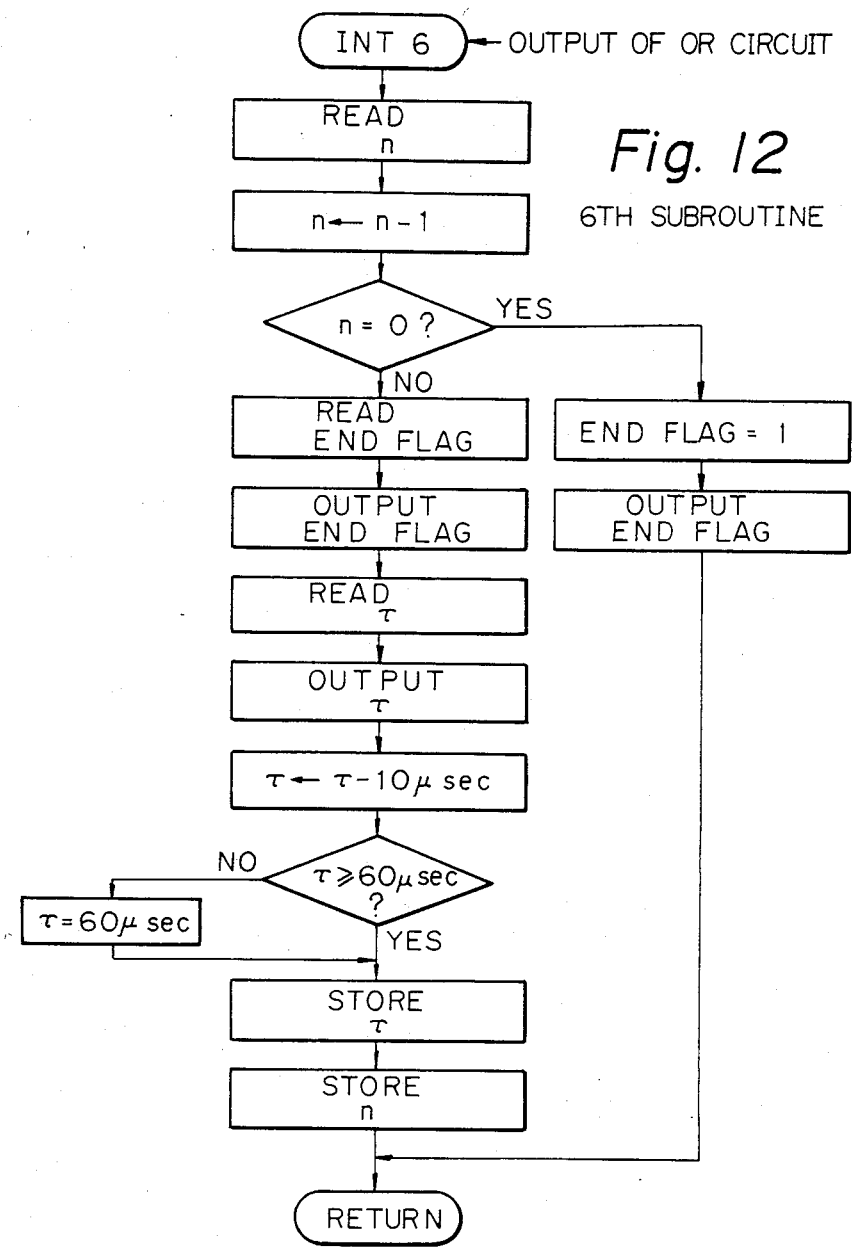
Figure 13:
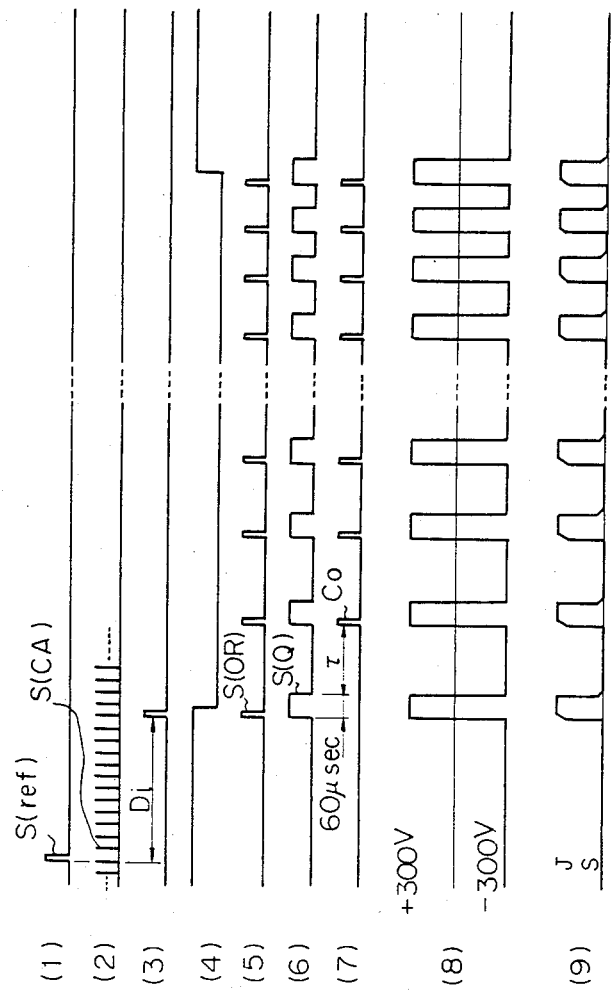
FIG. 13 shows the waveforms of signals in the flow charts shown in FIGS. 11 and 12.

FIGS. 11 and 12 are flow charts of the ECU 4. FIG. 11 shows the fifth routine, and FIG. 12 shows the sixth routine. FIG. 13 shows the waveforms of signals at the respective parts of ECU 4. FIG. 13(1) shows a reference signal (INT1), FIG. 13(2) shows an angle signal, FIG. 13(3) shows an angle comparator output, FIG. 13(4) shows a down counter reset signal, FIG. 13(5) shows an OR circuit output, FIG. 13(6) shows a one-shot multivibrator output, FIG. 13(7) shows a down counter carry output, FIG. 13(8) shows a driving signal, and FIG. 13(9) shows an injection state wherein J indicates injection and S indicates stop.

The program stored in the CPU 411 consists of the MAIN routine, the fifth routine started every time the interrupt input INT1 is received, and the sixth routine started every time the interrupt input INT2 is received.

In the MAIN routine, after each part is initialized, an interrupt is allowed to enter into the idle loop.

The fifth routine is started every time the reference signal S(ref) shown in FIG. 13(1) is received. The injection quantity q, the injection start timing $D_i$, the injection interval $\tau$, and the valve opening number n are calculated so as to control the fuel injection start timing. At the start of the fifth routine, the acceleration pedal opening $\theta$ is read in from the A/D converter 401. Next, the rotational cycle $T_N$ is read in from the engine rotation counter 453. An engine speed $N_E$ is calculated from the rotational cycle $T_N$. The correct injection quantity q is calculated by interpolation from the map of the injection quantity q for the opening $\theta$ and the engine speed $N_E$. The map is experimentally determined in advance and is stored in the ROM of the CPU 411.

Subsequently, the injection quantity q is divided by 1 mm³ per one opening of the unit injector 2 so as to obtain the injection number n of the nozzle. Meanwhile, the correct injection start timing $D_i$ is calculated by interpolation from the map for the injection quantity q and the injection start timing $D_i$ corresponding to the engine speed $N_E$. The map is similarly determined based on experiments and is stored in the ROM of the CPU.

The initial value $\tau_1$ of the interval $\tau$ is calculated in accordance with the relation:

$$\tau_1 = 300 - (N_E - 1000)/10 \ (\mu sec)$$

which is obtained by substituting n=1 in:

$$\tau = 300 - 10(n-1) - (N_E - 1000)/10 \ (\mu sec)$$

It is then checked if the initial value $\tau_1$ is 60 μsec or more. If the initial value $\tau_1$ is 60 μsec or less, the initial value $\tau_1$ is set at 60 μsec. In order to start injection, the end flag is set at level "0" and is latched in the latch 405. Then the injection start timing $D_i$ is latched in the angle latch 455. The injection number n, the injection interval initial value $\tau_1$, and the end flag are stored in the RAM.

The sixth routine shown in FIG. 12 is started every time the output from the OR circuit 459 shown in FIG. 13(5) goes to level "1". In this routine, the injection number n and the injection interval $\tau$ are controlled. First, the injection number n is read out from the RAM and the injection number n is updated to (n−1). It is checked if the updated number n is zero. If the number n is zero, the injection must end. Therefore, the end flag is set at level "1" and is supplied to the latch 405. If the number n is not zero, the end flag of level "0" is supplied to the latch 405. Subsequently, the injection interval $\tau$ is read out from the RAM and is supplied to the down counter 458. The interval $\tau$ is updated to ($\tau - 10$) μsec. It is then checked if the updated interval $\tau$ is 60 μsec or more. If the interval $\tau$ is less than 60 μsec, it is set at 60 μsec and is stored in the RAM again. The injection number n is stored in the RAM and the flow returns to the MAIN routine.

When the predetermined number of angle signals S(CA) shown in FIG. 13(2) are supplied to the angle counter 454 from the timing of the generation of the angle counter 454 after the reference signal S(ref) of FIG. 13(1) is produced, the output signal S(D) from the angle counter 454 equals the output signal S(D$_i$) from the angle latch 455. Then a pulse output signal shown in FIG. 13(3) appears as the output from the angle comparator 456. This means that the engine rotation angle has reached the injection start timing $D_i$. Then the output signal S(OR) shown in FIG. 13(5) is produced from the OR circuit 459 to trigger the one-shot multivibrator 408. The one-shot multivibrator 408 then produces a pulse output signal of 60 μsec, as is shown in FIG. 13(6). At the same time, in the sixth routine, the reset input R of the down counter 458 goes to level "0", and the down counter is activated.

The down counter 458 starts counting down in synchronization with the trailing edge of the output from the one-shot multivibrator 408. After the injection interval $\tau$ μsec has elapsed, a pulse output signal shown in FIG. 13(7) appears at the carry output $C_o$ of the down counter 458. This pulse output triggers the one-shot multivibrator 408 through the OR circuit 459 so as to generate another pulse signal of 60 μsec.

The above operation is repeated for the injection number. In the sixth (last) routine, the output signal from the latch 405 goes to level "1", as is shown in FIG. 13(4), and the down counter 458 is deactivated. Therefore, the last output signal from the one-shot multivibrator 408 is obtained.

The output signal from the one-shot multivibrator 408 is supplied to the driving circuit 409. When the received signal is at level "1", a driving voltage of +300 V shown in FIG. 13(8) is applied to the piezoelectric actuator 201. When the received signal is at level "0", a driving voltage of −300 V is applied to stop fuel injection. This is shown in FIG. 13(9).

According to this embodiment, the injection quantity is increased toward the end of each combustion operation for vigorous combustion, and, accordingly, the combustion efficiency of the internal combustion engine can be improved while suppressing noise.

Figure 14:
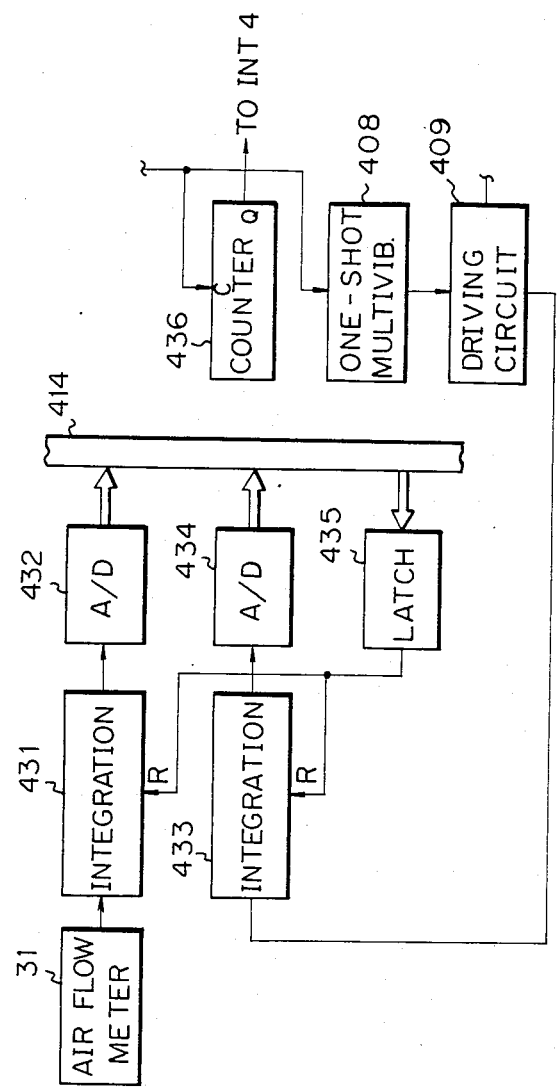
FIGS. 14 and 15 are portions of a block diagram of another example of an ECU of the system shown in FIG. 1.
Figure 15:
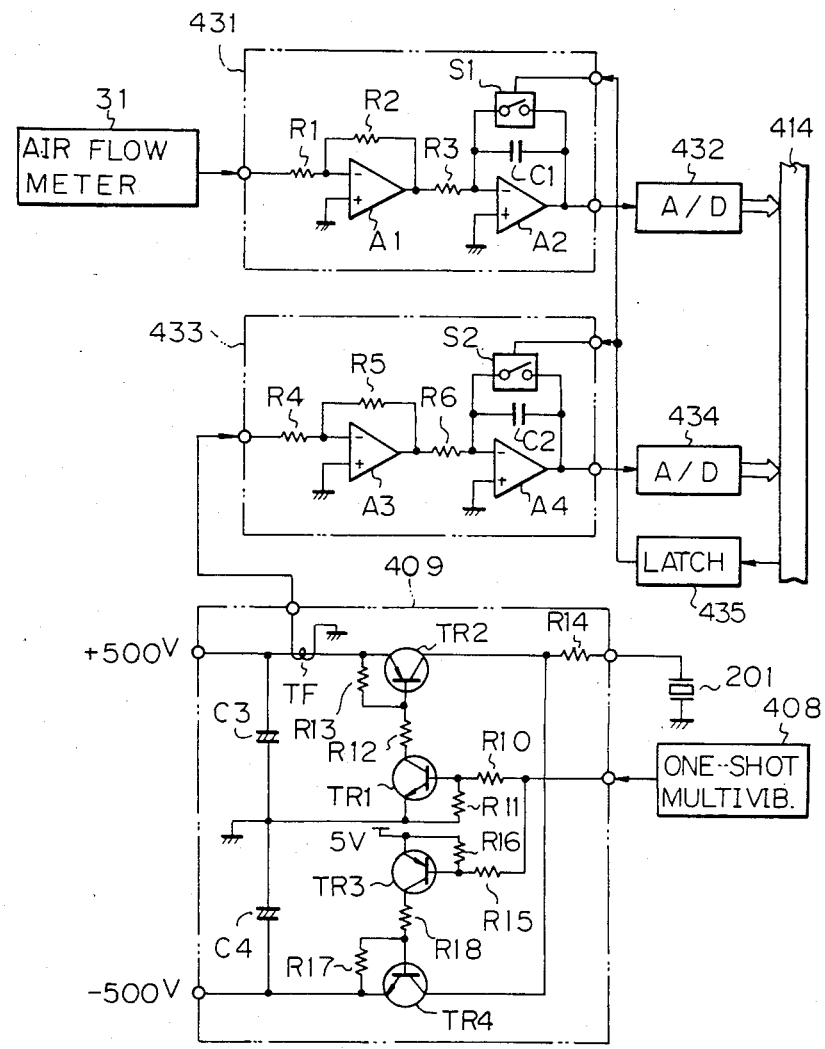

According to a further embodiment of the present invention, an ECU as is shown in FIGS. 14 and 15 is used. The amount of expansion/contraction of the piezoelectric actuator may change in accordance with variations between piezoelectric actuator or changes in overtime. Such a change in the amount of expansion/contraction of the piezoelectric actuator results in a change in the injection quantity and, hence, in the air-fuel ratio A/F. However, when the ECU shown in FIG. 14 is used, the piezoelectric actuator is driven and controlled in such a manner that the integrated value of the intake air flow rate and the driving voltage of the piezoelectric actuator hold a predetermined relationship. Accordingly, the above-mentioned problem is resolved.

Only those features of the ECU shown in FIG. 14 which are different from those of the former embodiments will be described. Referring to FIG. 14, reference numeral 431 denotes a first integration circuit, and reference numeral 432 denotes a third A/D converter. An output signal from the first integration circuit 431 is A/D converted, and the digital signal obtained is supplied onto the bus line 414. A second integration circuit 433 integrates a driving current output signal from the driving circuit 409. When a reset signal supplied to a reset terminal R of the second integration circuit 433 is at level "1", its integration operation is initialized and an output therefrom is cleared to 0. A fourth A/D converter 434 A/D converts an output signal from the second integration circuit 433 into a 16-bit digital signal which is supplied onto the bus line 414. A 1-bit latch 435 latches an integration reset signal from the CPU 411 and produces it. The output of the latch 435 is connected to the reset terminals R of the integration circuits 431 and 433. A 500-base counter 436 receives at its clock terminal C a coincidence signal from the digital comparator 407. Every time the coincidence signal from the digital comparator 407 is received, the counter 436 produces one pulse of level "1". The pulse is supplied to an interrupt input INT4 of the CPU 411.

Stabilized power from the battery 51 is constantly supplied to the RAM 413 through a resistor 438, a Zener diode 439, and a capacitor 440 irrespective of the switch 52 so that data in the RAM 413 may not be lost.

The integration operation will now be described. FIG. 15 shows the driving circuit 409, the first integration circuit 431, the second integration circuit 433, and the surrounding circuits. An operational amplifier A1 amplifies an output signal from the air flow meter 31 by a gain which is determined by resistors R1 and R2. In this embodiment, the gain is set to be −1. An operational amplifier A2 constitutes an integrator of a time constant which is determined by a resistor R3 and a capacitor C1. The operational amplifier A2 integrates the output signal from the operational amplifier A1. In this embodiment, the resistor R3 has a resistance of 21.71 kΩ and the capacitor C1 has a capacitance of 10 μF. An analog switch S1 electrically opens/closes. It closes when the control input is at level "1" so as to short-circuit the integrating capacitor C1 and to initialize the integrator. An output signal from the first integration circuit 431 is connected to the third A/D converter 432.

The second integration circuit 433 serves as a circuit similar to the first integration circuit and amplifies the driving current output signal by a gain which is determined by resistors R4 and R5. In this embodiment, this gain is set to be −1. An operational amplifier A4 constitutes an integrator having a time constant which is determined by a resistor R6 and a capacitor C2. The operational amplifier A4 integrates the output signal from an operational amplifier A3. In this embodiment, the resistor R6 has a resistance of 5 kΩ and the capacitor C2 has a capacitance of 1 μF. An analog switch S2 electrically opens/closes. It closes when the control input thereinto is at level "1" so as to short-circuit the integrating capacitor C2 and to initialize the integrated charge thereon. An output signal from the second integration circuit 433 is connected to the fourth A/D converter 434.

In the driving circuit 409, a voltage of +500 V is constantly stored on a capacitor C3 and a voltage of −500 V constantly stored on a capacitor C4 by a constant voltage power source. These capacitor C3 and C4 are incorporated so that the power source voltage may not fluctuate due to surge power when the piezoelectric actuator is driven. When the driving signal from the one-shot multivibrator 408 is at level "1", a transistor T1 is turned on through resistors R10 and R11. The collector current of the transistor T1 turns on a transistor T2 through resistors R12 and R13. Then a voltage of +500 V is applied to flow a current to the piezoelectric actuator 201 through a constant current control resistor R14. In this embodiment, the resistor R14 is set at 20 Ω. When the driving signal from the one-shot multivibrator 408 is at level "0", a transistor T3 is turned on through resistors R15 and R16. The collector current of the transistor T3 turns on a transistor T4 through resistors R17 and R18. A voltage of −500 V is applied so as to flow a current to the piezoelectric actuator 201 through the constant current control resistor R14. When the transistor T2 is turned on, the current flowing to the piezoelectric actuator 201 by the supplied voltage of 500 V is detected by a current transformer TF and is converted into a voltage signal to be coupled to the second integration circuit 433. In this embodiment, the characteristics of the current transformer TF are selected to be 10 A/V.

Figure 16:
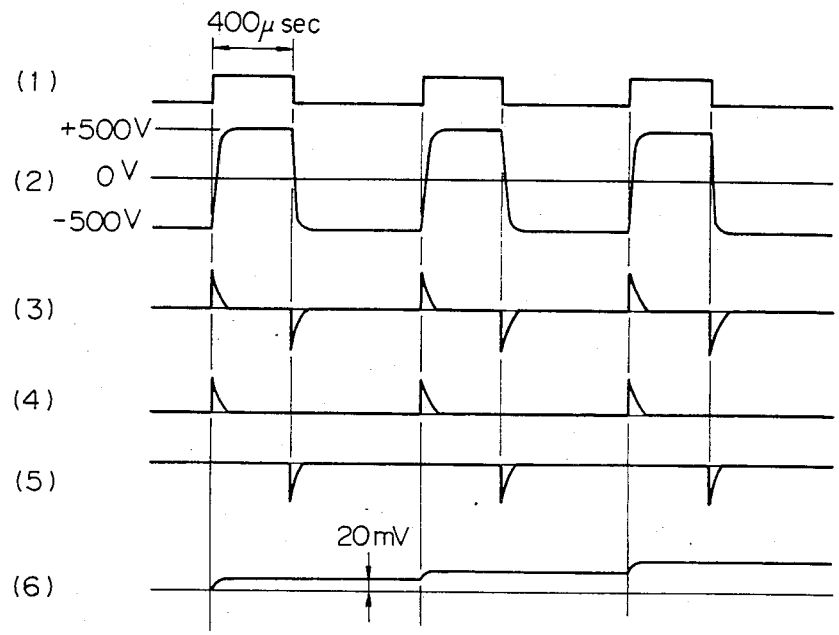
FIG. 16 shows the waveforms of signals at the respective parts of the integration circuit shown in FIG. 15.
Figure 17:
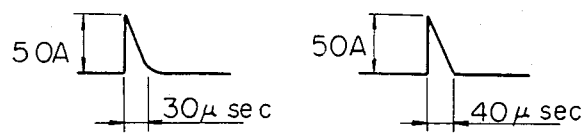
FIG. 17 shows in detail parts of the waveforms shown in FIG. 16.
Figure 19:
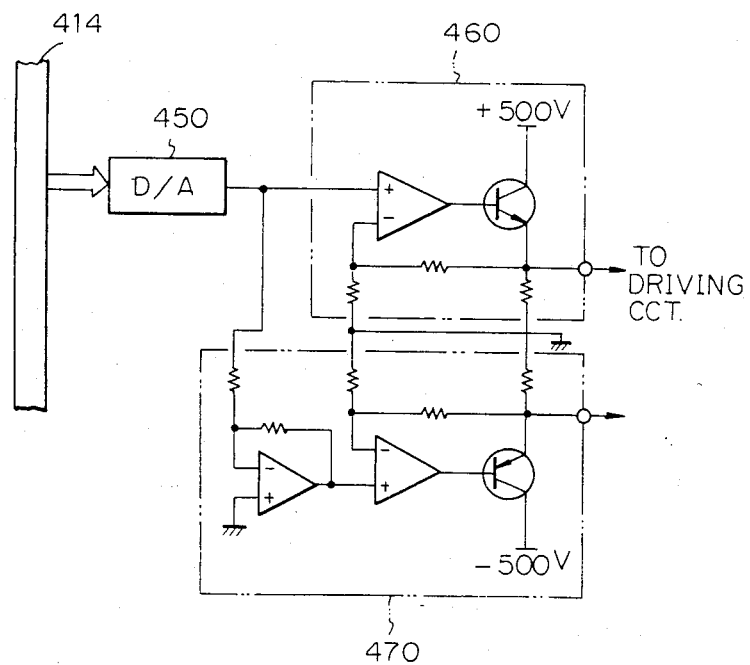
FIG. 19 is a portion of a circuit diagram showing another embodiment of the ECU used.

FIG. 16 shows the waveforms of signals at the respective parts of the circuit shown in FIGS. 14 and 15. Every time a driving signal (FIG. 16(1)) is received from the one-shot multivibrator 408, the driving circuit 409 generates driving voltages of +500 V and −500 V (FIG. 16(2)) so as to drive the piezoelectric actuator 201. At this time, a current having a peak current of 50 A as is shown in FIG. 16(3) flows to the piezoelectric actuator 201. FIG. 16(4) shows the charging current waveforms when a voltage of +500 V is applied to allow the pumping operation of the piezoelectric actuator 201. FIG. 19 shows the details of this waveform. The details of the waveform shown in FIG. 16(4) are the actual waveforms of the charging current on the left in FIG. 17. The time constant is determined by the constant current control resistor R14 and the capacitance (1.5 μF) of the piezoelectric actuator 201 and is 30 μsec. This is considered to approximate a triangular wave having a peak current of 50 A and a duration of 40 μsec, as is shown on the right in FIG. 17. This current is converted into a triangular wave having a peak voltage of 50 V and a duration of 40 μsec by the current transformer TF.

The second integration circuit 433 integrates the driving current signal as is shown in FIG. 16(6). The signal is incremented by 20 mV in each integration operation. When the integration operation is repeated 500 times, a voltage of 50 V is obtained as the driving current integrated value.

Meanwhile, the first integration circuit 431 integrates an output signal (10 g/sec/V) from the air flow meter 31. In this case, the final integrated value is to be adjusted to be 10 V, under the standard condition.

When the piezoelectric actuator 201 expands/contracts for 50 μm upon the application of a voltage of ±500 V and fuel is injected in the amount of, for example, 5 mm³, the integrated driving current and the integrated air amount both become 10 V and the proportionality constant k need not be changed. If the amount of expansion/contraction of the piezoelectric actuator 201 is decreased for some reason (e.g., temperature change or time elapse) and the injection quantity is decreased accordingly, the driving current is decreased. Accordingly, the integrated driving current becomes less than 10 V. For example, when the amount of expansion/contraction of the piezoelectric actuator 201 is 40 μm and the injection quantity is 4 mm³, the peak driving current becomes 40 A and the integrated driving current is decreased to 8 V. When the proportionality constant k is not changed, since the integrated air amount remains 10 V, the correction is carried out by multiplying the proportionality constant k by 10/8 by the operation of the CPU 430. Thus, the integrated air amount value at the next operation timing coincides with the integrated driving current value, which results in the achievement of the correct correction.

When the amount of expansion/contraction of the piezoelectric actuator 201 is increased, the correction can also be carried out in a similar manner as described above. For example, when the integrated driving current value increases from 10 V to 12 V, the correction can be carried out by multiplying the proportionality constant k by 10/12. The air-fuel ratio A/F can be maintained at the stoichiometrical air-fuel ratio. The number of times of integration is selected as a large number 500 since it is necessary to detect the average variation of the value in order to eliminate the influence of the O₂ sensor feedback.

With regard to the proportionality constant k, the correction by k is possible if the step of the calculation "F×p" in the first routine (FIG. 6B) is replaced by the step of the calculation "F×k×p". That is, the proportionality constant k obtained in the seventh routine (described later) is read. Then the proportionality constant k and the correction coefficient p are read in the first routine and the corrected driving injection frequency is obtained by multiplying the fundamental injection frequency by the read proportionality coefficient K and coefficient P.

Figure 18:
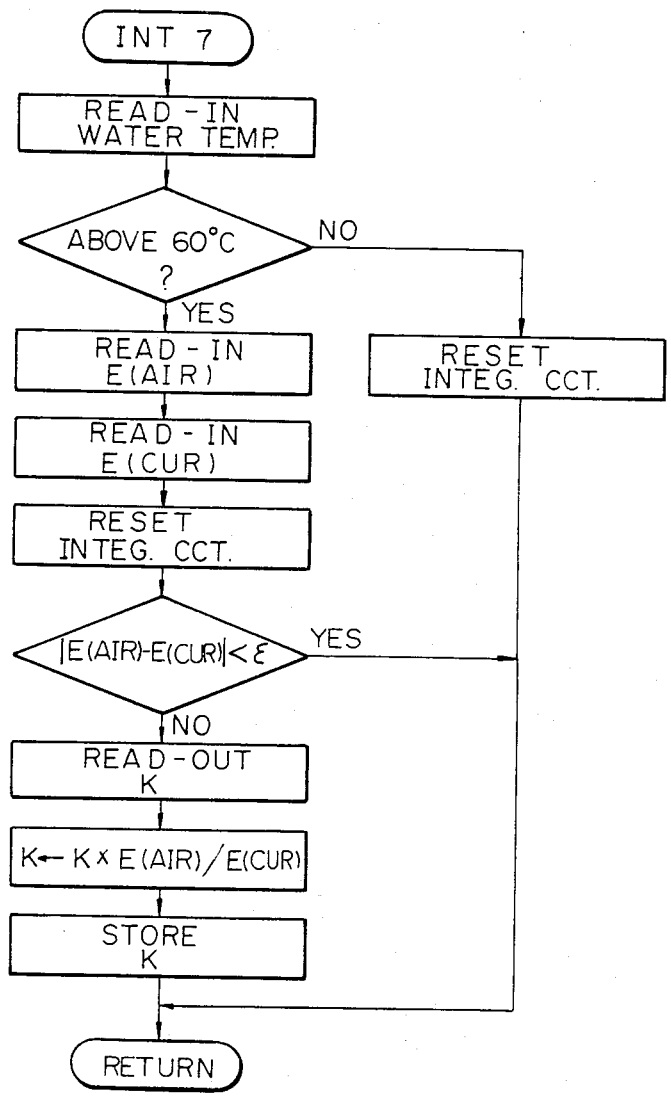
FIG. 18 is a flow chart of the operation of the system when the ECU shown in FIGS. 14 and 15 is used.

The seventh routine shown in FIG. 18 will now be described. The fourth routine has the lowest priority order corresponding to INT4 and is started every time the driving signal is produced 500 times. The water temperature data is read in from the second A/D converter 402. It is then checked if the water temperature is 60° C. or higher. If the water temperature is 60° C. or higher, the following processing is performed. The integrated air amount E(Air) is read in from the third A/D converter 432. Next, the integrated driving current E(Cur) is read in from the fourth A/D converter 434. Thereafter, the reset signal for the integrating capacitor of the latch 435 is produced for the next integration operation. The integrated air amount E(Air) and the integrated driving current E(Cur) are compared with each other. If the absolute value of the difference between these two integrated values is less than a predetermined constant ε, the proportionality constant k need not be changed and the flow returns to the MAIN routine. If the value E(Air) is larger than the data E(Cur), this means that the injection quantity is small with respect to the intake air flow rate. Thus, the proportionality constant k is corrected. The proportionality constant k may be corrected by multiplying E(Air)/E(Cur) by k or by incrementing the constant in increments of 5%. In any case, E(Air) and E(Cur) converge to coincide so as to maintain the air-fuel ratio at the theoretical air-fuel ratio. On the other hand, if the value E(Air) is smaller than E(Cur), the proportionality constant k is similarly corrected. The corrected proportionality constant k is stored in the RAM 413 and the flow returns to the MAIN flow. The proportionality constant k updated in this manner is used for calculation of the fundamental frequency in the first routine shown in FIG. 6B. Since the RAM 413 has backup power, the contents stored in the RAM 413 may not be lost even if the power is turned off. After the second correction or updating of the proportionality constant k, the preceding result may be used, thus providing a learning effect. When the water temperature is lower than 60° C., the air-fuel ratio A/F is not identical to the theoretical air-fuel ratio. Therefore, the proportionality constant k is not corrected in the manner described above, and initialization of the integration circuits alone is performed. The flow then returns to the MAIN routine.

In this manner, the proportionality constant k is corrected at predetermined intervals in accordance with the relationship between the integrated driving current and the integrated air amount. Accordingly, the fundamental frequency for attaining the theoretical air-fuel ratio can be constantly obtained.

The mode of operation of the ECU shown in FIGS. 14 and 15 has been described with reference to a case wherein the integrated driving current and the integrated air amount are compared with each other and the driving frequency is changed so that the integrated driving current and the integrated air amount coincide with each other. However, the driving voltage may be corrected instead of correcting the frequency. FIG. 19 shows a case wherein the driving voltage is changed. In this case, when the value E(Air) is larger than E(Cur), the CPU 411 sets the preceding value of the ratio E(Air)/E(Cur) in a D/A converter 450. An output from the D/A converter 450 is converted into voltages ±50 times the orignal value by stabilizers 460 and 470, which voltages are then supplied to the driving circuit 409. When the value E(Air) is smaller than E(Cur), the output to the D/A converter 450 is decreased to lower the driving voltage, thereby decreasing the injection quantity.

Alternatively, the driving current itself may be set as a constant current, and the constant current or conduction time may be changed for correction.

In the embodiments described above, the amount of expansion/contraction of a pressure actuator such as a piezoelectric actuator is indirectly detected by the integrated driving current, and the detected amount is controlled to hold a predetermined relationship with the integrated intake air amount. Accordingly, even if the characteristics of the actuator change, the air-fuel ratio can be constantly controlled with high precision.

When the integration time is determined by the number of driving operations, a substantially constant final integrated value can be obtained independently of the engine conditions. Then degradation in the detection precision of the sensors is prevented. If the integration time is set to be sufficiently longer than the feedback period of the $O_2$ sensor, the pulsation of the air-fuel ratio A/F by the feedback from the $O_2$ sensor can be averaged and changes in the air-fuel ratio A/F can be reliably detected.

We claim:

1. A fuel injection system for an internal combustion engine of the type including at least one combustion chamber, said system comprising:
   load sensing means for sensing engine load;
   position sensor means for sensing a reference rotational position of the engine;
   a unit injector, connected to a source of fuel, for compressing fuel and for injecting a predetermined amount of the compressed fuel into said engine combustion chamber, said unit injector including an actuator adapted to be selectively expanded and compressed in response to electrical driving voltages, a pump chamber, piston means operatively coupled to said actuator for delivering fuel to the pump chamber and for compressing said delivered fuel, and an injection valve for injecting said compressed fuel within the pump chamber into the combustion chamber; and
   electronic control means for selectively applying driving voltage to said actuator, for controlling the number of applications of the driving voltage during the period of each rotation of said engine in response to the sensing of engine rotational position by said position sensing means and for controlling the quantity of fuel injected into said combustion chamber on the basis of the number of drivings of said actuator so as to carry out at least three fuel injections n, where n is proportional to the load on the engine sensed by said load sensing means, for each combustion within said combustion chamber, said electronic control means being adapted to control said driving voltage of said actuator so as to reduce the interval between two successive injections of fuel into said combustion chamber as the rotational speed of the engine increases, said electronic control means, at least at low rotational speeds, also reducing the interval between two successive injections occurring later in each particular combustion as compared to the interval between two successive injections occurring earlier in each particular combustion.

2. A system according to claim 1, wherein said interval is given by the following equation where $\tau_n$ is said interval, N is the rotational speed of the engine and A, B, C and D are preselected constants:

$$\tau_n = A - B(n-1) - (N-C)/D.$$

3. A system according to claim 1, wherein:
   said load sensing means includes an air flow sensor; and
   said electronic control means controls said driving voltage so as to make an integrated value of air amount sensed by said air flow sensor and an integrated value of said driving voltage during a predetermined period maintain a predetermined relationship based upon signals from said position sensor means.

4. A system according to claim 1, wherein said fuel injector comprises a substantially cylindrical upper casing defining a fuel path for supplying fuel to said pump chamber, a nozzle body having a nozzle, a needle valve arranged slidably in said nozzle body and a distance piece arranged between said nozzle body and said upper casing defining a path connected to said fuel path, said actuator and said piston being arranged in said upper casing, the closing force of said needle valve being exerted by the pressure of the fuel supply and the opening force for said needle valve being exerted by the pressure of the compressed fuel from said pump chamber, said unit injector also including a check valve provided in said path formed in said distance piece, said check valve including a ball and a projection formed on said piston for regulating said ball.

5. A fuel injection system for an internal combustion engine of the type including at least one combustion chamber and a crankshaft, said system comprising:
   angular position sensor means for sensing the rotational position of the engine crankshaft;
   fuel injection means, connected to a source of fuel, for compressing fuel and for injecting a predetermined amount of the compressed fuel into said engine combustion chamber, said injection means including piezoelectric actuator means for selectively expanding and compressing in response to a driving signal, a pump chamber, means coupled to said actuator means for delivering fuel to said pump chamber and compressing said delivered fuel, and injection valve means for injecting a quantity of said compressed fuel from said pump chamber into the combustion chamber; and
   electronic control means for selectively applying driving signals to said actuator means, for controlling the number of applications of the driving signal during a period over which said rotation sensing means senses a predetermined reference engine rotational displacement, and for controlling the quantity of fuel injected into said combustion chamber by said actuator means,
   said injector means comprising a substantially cylindrical upper casing, a nozzle body including means defining a nozzle, a needle valve arranged slidably in said nozzle body and a distance piece disposed between said nozzle body and said upper casing, said actuator means and said piston means being disposed in said upper casing, the closing force for said needle valve being exerted by the pressure of the fuel at said fuel source, the opening force for said needle valve being exerted by the pressure of the compressed fuel within said pump chamber, and further including menas defining a first fuel path formed in said upper casing and means defining a second path connected to said fuel path formed in said distance piece for supplying fuel from said fuel source to said pump chamber, a check valve provided in said second path formed in said distance piece, said check value including a ball, and a projection means, formed on said piston means, for regulating the position of said ball.

6. A fuel injection system according to claim 1, wherein said actuator is a piezoelectric actuator.

7. A fuel injection system according to claim 6, wherein said unit injector comprises a substantially cylindrical upper casing, a nozzle body having a nozzle, a needle valve arranged slidably in said nozzle body, and a distance piece arranged between said nozzle body and said upper casing, said piezoelectric actuator and said piston being arranged in said upoer casing, the closing force for said needle valve being exerted by the pressure of the supply fuel, and the opening force for said needle valve being exerted by the pressure of the compressed fuel from said pump chamber.

8. A fuel injection system according to claim 7, wherein a fuel path is formed in said upper casing for supplying fuel to said pump chamber, a path connected to said fuel path is formed in said distance piece, and a check valve is provided in said path formed in said distance piece.

9. A fuel injection system according to claim 8, wherein said check valve includes a ball and a projection is formed on said piston for regulating said ball.

10. A fuel injection system according to claim 1, wherein said electronic control means is adapted to control said driving voltage of said actuator so as to make the integrated air amount and the integrated driving voltage of said actuator during a predetermined period maintain a predetermined relationship based on the signals from said sensor means.

11. A system according to claim 1, wherein said control means reduces the interval between the n-th injection and the (n+1)-th injection in the sequence of fuel injections as n increases.

12. A system according to claim 11, wherein said control means determines the interval $\tau_n$ in μsec between the n-th injection and the (n+1)-th injection in the sequence of fuel injections by the following equation, where N is the engine rotational speed in rpm, and A, B, C, and D are constants:

$$\tau_n = A - B(n-1)\frac{N-C}{D}.$$

13. A system according to claim 1, wherein said unit injector comprises a substantially cylindrical upper casing, a nozzle body including means defining a nozzle, a needle valve arranged slidably in said nozzle body, and a distance piece disposed between said nozzle body and said upper casing, said actuator and said piston means being disposed in said upper casing, the closing force for said needle valve being exerted by the pressure of fuel at said fuel source, the opening force for said needle valve being exerted by the pressure of the compressed fuel within said pump chamber, a first fuel path being formed in said upper casing for supplying fuel from said fuel source to said pump chamber, a second fuel path connecting said first fuel path to said nozzle body being formed in said distance piece, a check valve selectively obstructing said second path formed in said distance piece, said check valve including a ball, a projection being formed on said piston for regulating the position of said ball.

14. A system according to claim 1, wherein said load sensing means includes an air flow sensor means for producing a signal indicating the air flow of said engine said driving voltage of said actuator so as to cause the integrated air amount and the integrated driving voltage of said actuator during a predetermined period to maintain a predetermined relationship in response to said air flow signal and the engine rotation position sensed by said position sensing means.

* * * * *